US012228955B2

(12) United States Patent
Kim et al.

(10) Patent No.: US 12,228,955 B2
(45) Date of Patent: *Feb. 18, 2025

(54) SYSTEM-ON-CHIP INCLUDING LOW-DROPOUT REGULATOR

(71) Applicant: SAMSUNG ELECTRONICS CO., LTD., Suwon-si (KR)

(72) Inventors: Seki Kim, Suwon-si (KR); Sangho Kim, Suwon-si (KR); Yongjin Lee, Goyang-si (KR); Hyongmin Lee, Seoul (KR); Dongha Lee, Suwon-si (KR); Byeongbae Lee, Hwaseong-si (KR); Sungyong Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,721

(22) Filed: Nov. 3, 2023

(65) Prior Publication Data

US 2024/0061458 A1 Feb. 22, 2024

Related U.S. Application Data

(63) Continuation of application No. 17/845,541, filed on Jun. 21, 2022, now Pat. No. 11,846,958.

(30) Foreign Application Priority Data

Jun. 21, 2021 (KR) .................. 10-2021-0080364
Aug. 5, 2021 (KR) .................. 10-2021-0103480

(51) Int. Cl.
*G05F 1/575* (2006.01)
*G05F 1/46* (2006.01)

(52) U.S. Cl.
CPC ............... *G05F 1/575* (2013.01); *G05F 1/46* (2013.01)

(58) Field of Classification Search
None
See application file for complete search history.

(56) References Cited

U.S. PATENT DOCUMENTS 7,218,168 B1   5/2007  Rahman
9,170,592 B2 * 10/2015  Seymour .................. G06F 1/30
(Continued)

FOREIGN PATENT DOCUMENTS

EP     3 594 773 A1    1/2020
KR    10-2083073 B1    2/2020
KR    10-2132402 B1    7/2020

OTHER PUBLICATIONS

"Collective." Merriam-Webster.com Dictionary, 2024, Merriam-Webster, https://www.merriam-webster.com/dictionary/collective. Accessed Oct. 17, 2024.*

(Continued)

*Primary Examiner* — Thomas J. Hiltunen
(74) *Attorney, Agent, or Firm* — Sughrue Mion, PLLC

(57) ABSTRACT

A system-on-chip according to an embodiment includes a core including a header switch circuit configured to transmit a power supply voltage applied to a first power rail as a supply voltage to a second power rail and a logic circuit configured to operate based on the supply voltage from the second power rail, and a low-dropout (LDO) regulator configured to regulate a magnitude of first current output to the second power rail based on a change in the supply voltage, wherein the LDO regulator is further configured to control on/off of a plurality of first header switches included in the header switch circuit based on an amount of the change in the supply voltage.

20 Claims, 26 Drawing Sheets

(56) References Cited

U.S. PATENT DOCUMENTS

| | | | |
|---|---|---|---|
| 9,417,643 B2 | 8/2016 | Saint-Laurent et al. | |
| 9,417,645 B2 | 8/2016 | Utsunomiya | |
| 9,734,904 B1 | 8/2017 | Cho et al. | |
| 9,939,883 B2* | 4/2018 | Swarna | G06F 1/3296 |
| 10,126,766 B2* | 11/2018 | Cho | G05F 1/56 |
| 10,126,768 B2 | 11/2018 | Burgio et al. | |
| 10,216,209 B1* | 2/2019 | Ham | G05F 1/575 |
| 10,234,932 B2 | 3/2019 | Chen et al. | |
| 10,389,224 B2 | 8/2019 | Huang | |
| 10,474,174 B2 | 11/2019 | Na et al. | |
| 10,649,479 B2 | 5/2020 | Heo et al. | |
| 10,775,818 B2 | 9/2020 | Tiedemann | |
| 10,845,831 B2 | 11/2020 | Liu et al. | |
| 10,984,839 B2 | 4/2021 | Tang et al. | |
| 11,444,532 B2* | 9/2022 | Liu | H02M 3/158 |
| 11,675,379 B2* | 6/2023 | Ahmed | H02M 3/158 713/300 |
| 11,846,958 B2* | 12/2023 | Kim | G06F 1/26 |
| 2009/0033298 A1 | 2/2009 | Kleveland | |
| 2011/0167629 A1 | 7/2011 | Jwalant et al. | |
| 2013/0328533 A1 | 12/2013 | Idgunj et al. | |
| 2014/0084881 A1 | 3/2014 | Shih et al. | |
| 2014/0223205 A1 | 8/2014 | Muthukaruppan et al. | |
| 2014/0266103 A1* | 9/2014 | Wang | G05F 1/565 323/275 |
| 2014/0277812 A1* | 9/2014 | Shih | G05F 1/46 700/297 |
| 2015/0042296 A1 | 2/2015 | Cheng et al. | |
| 2016/0202714 A1 | 7/2016 | Luria et al. | |
| 2017/0083031 A1 | 3/2017 | Atallah et al. | |
| 2017/0212540 A1 | 7/2017 | Cho et al. | |
| 2020/0293076 A1 | 9/2020 | Hsieh et al. | |
| 2021/0089112 A1 | 3/2021 | Saxena et al. | |

OTHER PUBLICATIONS

Arvind Singh et al., "A Digital Low-Dropout Regulator With Autotuned PID Compensator and Dynamic Gain Control for Improved Transient Performance Under Process Variations and Aging", IEEE Transactions on Power Electronics, vol. 35, No. 3, Jul. 2019, 13 pages total.

Communication dated Nov. 17, 2022, issued by the European Patent Office in European Application No. 22179910.9.

Keith A. Bowman et al., "A 7nm All-Digital Leakage-Current-Supply Circuit for Analog LDO Dropout Voltage Reduction", IEEE Solid-State Circuits Letters, Oct. 2019, 5 pages total.

* cited by examiner

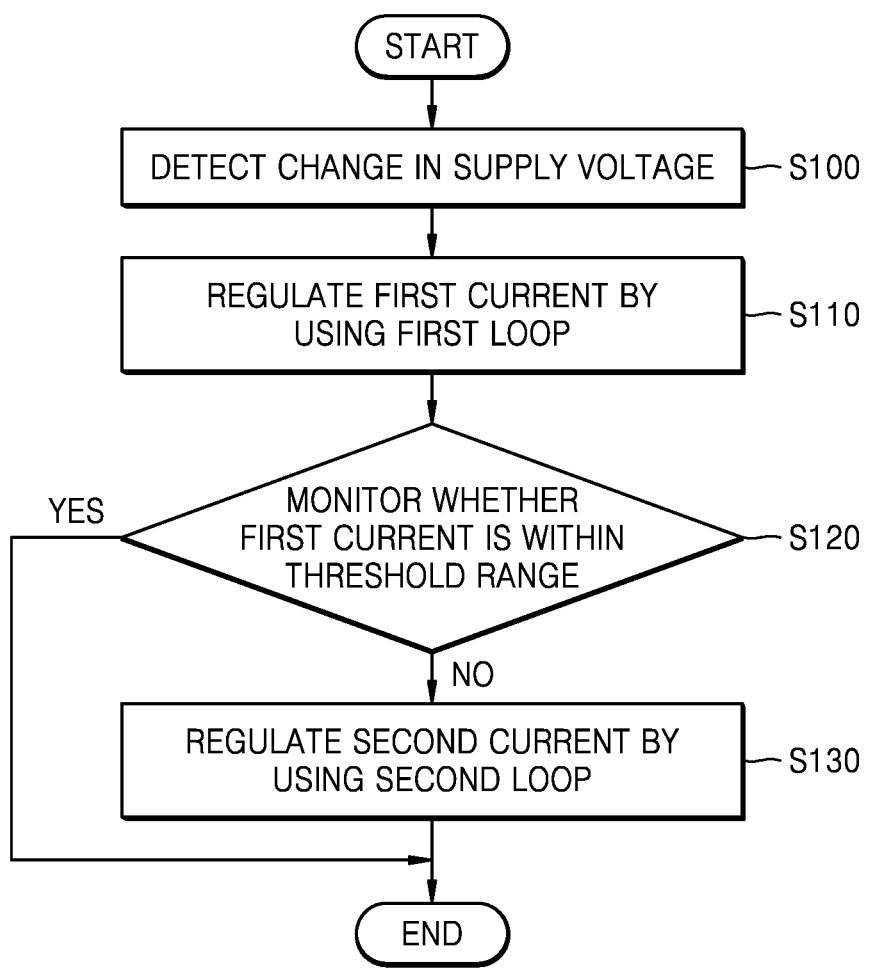

| Sub1 | Sub2 | Sub3 | Sub4 |
|---|---|---|---|
| SW1 | SW2 | SW3 | SW4 |
| Sub5 | Sub6 | Sub7 | Sub8 |
| SW5 | SW6 | SW7 | SW8 |
| Sub9 | Sub10 | Sub11 | Sub12 |
| SW9 | SW10 | SW11 | SW12 |
| Sub13 | Sub14 | Sub15 | Sub16 |
| SW13 | SW14 | SW15 | SW16 |

CS1[4bits]

| Difference Range | # of turn on | # of turn off |
|---|---|---|
| RG11 | A1 | A2 |
| RG21 | B1 | B2 |
| RG31 | C1 | C2 |

| Supply Voltage Range | Selected CLK_SH |
|---|---|
| RG12 | CLK_SH1 |
| RG22 | CLK_SH2 |
| RG32 | CLK_SH3 |

SYSTEM-ON-CHIP INCLUDING LOW-DROPOUT REGULATOR

CROSS-REFERENCE TO RELATED APPLICATIONS

This application is a continuation application of U.S. Ser. No. 17/845,541, filed on Jun. 21, 2022, which is based on and claims priority under 35 U.S.C § 119 to Korean Patent Application Nos. 10-2021-0080364 and 10-2021-0103480, respectively filed on Jun. 21, 2021 and Aug. 5, 2021, in the Korean Intellectual Property Office, the disclosures of which are incorporated by reference herein in their entireties.

BACKGROUND

The inventive concept relates to a system-on-chip, and more particularly, to a system-on-chip including a low-dropout (LDO) regulator.

As the performance of mobile devices has recently been continuously improved, the complexity of application processors has increased. Accordingly, as the number of power supply voltages supplied to an application processor has increased, the number of power routings connected to the application processor in a power management integrated circuit (PMIC) has increased, and due to an increase in the number of internal circuits of the PMIC, the number of off-chip load capacitors and inductors has also greatly increased.

Although product development is progressing to merge power domains of cores of an application processor, this hinders power management gain through dynamic voltage scaling (DVS). Although a system-on-chip (SoC) including an application processor tends to include an LDO regulator to minimize damage caused by merging of power domains, the inclusion of the LDO regulator in an expensive SoC process may be a burden.

SUMMARY

One or more example embodiments provide a system-on-chip including a low-dropout regulator which may reduce the number of power routings between a core and a power management integrated circuit (PMIC) and off-chip devices and reducing production costs, and a method of operating the system-on-chip.

According to an aspect of an example embodiment of the inventive concept, there is provided a system-on-chip including a core comprising a header switch circuit configured to transmit a power supply voltage applied to a first power rail as a supply voltage to a second power rail and a logic circuit configured to operate based on the supply voltage received from the second power rail, and a low-dropout (LDO) regulator configured to regulate a magnitude of a first current output to the second power rail based on a change in the supply voltage, wherein the LDO regulator is further configured to control on/off states of a plurality of first header switches included in the header switch circuit based on an amount of the change in the supply voltage.

According to another aspect of an example embodiment of the inventive concept, there is provided a system-on-chip including a core comprising a plurality of first header switches connected between a first power rail to which a power supply voltage is applied and a second power rail and a plurality of logic blocks connected between the second power rail and a ground rail, and a low-dropout (LDO) regulator comprising an output node connected to the second power rail, and configured to regulate, based on a change in a voltage of the second power rail detected through the output node, at least one of a first current, output to the second power rail through the output node, or a second current output to the second power rail through the plurality of first header switches.

According to another aspect of the inventive concept, there is provided a system-on-chip including a core including a header switch circuit configured to transmit a power supply voltage applied to a first power rail as a supply voltage to a second power rail and a logic circuit configured to operate based on the supply voltage received from the second power rail, and a low-dropout (LDO) regulator configured to, based on a change in the supply voltage, regulate at least one of a first current or a second current flowing to the logic circuit through a plurality of first header switches included in the header switch circuit, wherein the LDO regulator includes an output node connected to the second power rail and configured to output the first current to the logic circuit, an error amplifier configured to compare a feedback voltage corresponding to the supply voltage detected from the output node with a first reference voltage, an analog transistor configured to generate the first current based on a comparison signal from the error amplifier, a current divider configured to copy the first current and divide the copied first current at a certain ratio, a reference current generator configured to generate a first reference current and a second reference current, a first current comparator configured to generate an up signal based on comparing the first reference current with the divided first current, a second current comparator configured to generate a down signal based on comparing the second reference current with the divided first current, and a bidirectional shift register configured to generate an on/off control signal for the plurality of first header switches based on the up signal and the down signal.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2A is a flowchart illustrating an operating method of an internal low-dropout (LDO) regulator included in a system-on-chip, according to an embodiment of the inventive concept;

FIGS. 6A, 6B, and 6C are views for describing a distribution of header switches included in a first header switch group of FIG. 5;

DETAILED DESCRIPTION

Figure 1:
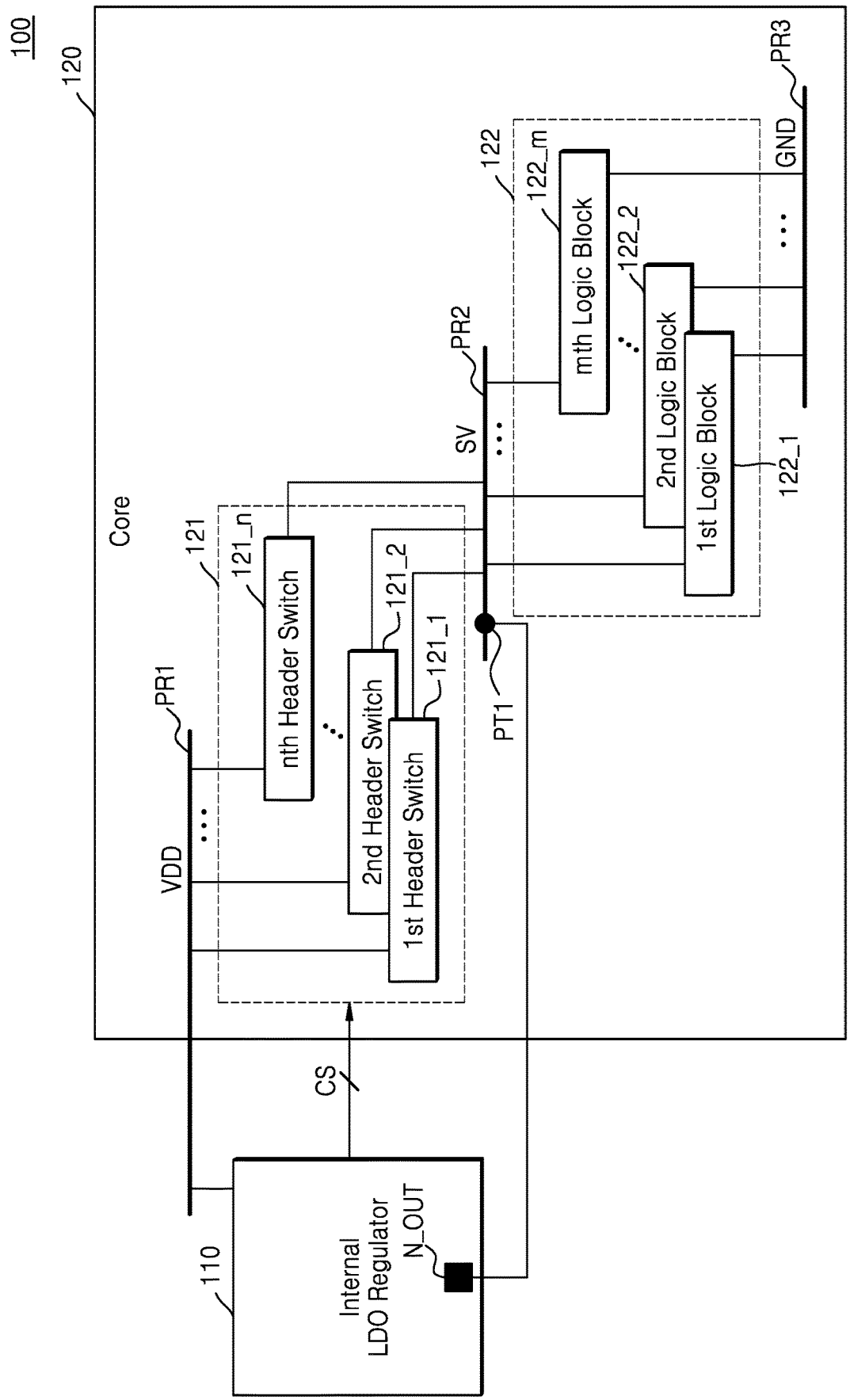
FIG. 1 is a block diagram illustrating a system-on-chip according to an embodiment of the inventive concept.

One or more example embodiments of the disclosure are illustrated in the drawings and are described in detail in the detailed description. However, it is to be understood that the disclosure is not limited to the one or more specific embodiments, but includes all modifications, equivalents, and substitutions without departing from the scope and spirit of the disclosure. In the context of the description of the drawings, like reference numerals may be used for similar components.

FIG. 1 is a block diagram illustrating a system-on-chip 100, according to an embodiment of the inventive concept. In FIG. 1, the system-on-chip 100 is any one of processing units such as a central processing unit (CPU) or a graphics processing unit (GPU), and embodiments of the inventive concept described below may be applied to a plurality of cores (not shown) included in the system-on-chip 100. In the specification, although the inventive concept is implemented in the system-on-chip 100, this is merely an embodiment, and the inventive concept is not limited thereto and may be applied to circuits including at least one core.

Referring to FIG. 1, the system-on-chip 100 may include an internal low-dropout (LDO) regulator 110 and a core 120. In the specification, the internal LDO regulator 110 may be referred to as an LDO regulator.

In an embodiment, the core 120 may include a header switch circuit 121 and a logic circuit 122. The header switch circuit 121 may be connected between a first power rail PR1 and a second power rail PR2. The header switch circuit 121 may transmit a power supply voltage VDD applied to the first power rail PR1 as a supply voltage SV to the second power rail PR2. The header switch circuit 121 may include a first header switch 121_1 through an n-th header switch 121_n. The first power rail PR1 and the second power rail PR2 may be electrically connected to each other through at least one header switch that is in a power-on state from among the first through nth header switches 121_1 through 121_n (n is an integer equal to or greater than 2), and the header switch may be referred to as a power gating cell. The logic circuit 122 may be connected between the second power rail PR2 and a third power rail PR3. In the specification, the third power rail PR3 may be referred to as a ground rail. The logic circuit 122 may operate by receiving the supply voltage SV from the second power rail PR2. The logic circuit 122 may include a first logic block 122_1 through an mth logic block 122_m (m is an integer equal to or greater than 2). Each of the first through mth logic blocks 122_1 through 122_m may perform a certain operation by using the supply voltage SV, and the logic block may include at least one standard cell.

A magnitude of load current flowing to the logic circuit 122 may instantaneously increase according to operation states of the first through mth logic blocks 122_1 through 122_m of the logic circuit 122, and as a result, a voltage (or the supply voltage SV) of the second power rail PR2 may temporarily decrease. In contrast, a magnitude of load current flowing to the logic circuit 122 may instantaneously decrease according to operation states of the first through mth logic blocks 122_1 through 122_m of the logic circuit 122, and as a result, a voltage (or the supply voltage SV) of the second power rail PR2 may temporarily increase. A voltage of the second power rail PR2 (or the supply voltage SV) may be fluctuated by the logic circuit 122. Hereinafter, a voltage of the second power rail PR2 is referred to as the supply voltage SV for the consistency of terms. Also, in the specification, a change in the supply voltage SV may be interpreted as being the same as a change in load current.

In an embodiment, the internal LDO regulator 110 may include an output node N_OUT connected to the second power rail PR2. Also, the internal LDO regulator 110 may be connected to the first power rail PR1, receive the power supply voltage VDD through the first power rail PR1, and perform operations according to embodiments of the inventive concept described below based on the power supply voltage VDD. However, this is merely an embodiment, and the inventive concept is not limited thereto, and the internal LDO regulator 110 may receive a power supply voltage through a power rail other than the first power rail PR1.

In an embodiment, the internal LDO regulator 110 may regulate at least one of first current output from the output node N_OUT and second current of the header switch circuit 121 to stabilize the supply voltage SV. In the specification, the first current refers to current flowing to the second power rail PR2 (or the logic circuit 122) through the output node N_OUT, and the second current refers to current flowing to the second power rail PR2 (or the logic circuit 122) through the header switch circuit 121. However, this is merely an embodiment, and the first and second currents are not limited thereto, and the first current may refer to current generated in the internal LDO regulator 110 and the second current may refer to current generated in the core 120 or the header switch circuit 121.

In an embodiment, the internal LDO regulator 110 may detect the supply voltage SV at a first point PT1 of the second power rail PR2 through the output node N_OUT. In some embodiments, the internal LDO regulator 110 may detect supply voltages at a plurality of points of the second power rail PR2, and may use at least one of the detected supply voltages. In detail, the internal LDO regulator 110 may selectively use at least one supply voltage (e.g., lowest supply voltage) from among the detected supply voltages, or may use an average value of the detected supply voltages. At least one point of the second power rail PR2 for detecting the supply voltage SV may be pre-determined and fixed, or may be selected through a training process from among the plurality of points.

In an embodiment, the internal LDO regulator 110 may regulate the first current in response to a change in the supply voltage SV. In detail, the internal LDO regulator 110 may regulate the first current to increase when the supply voltage SV decreases and to decrease when the supply voltage SV increases. The internal LDO regulator 110 may additionally regulate the second current of the header switch circuit 121 such that a magnitude of the regulated first current is limited within a first threshold range. Hereinafter, an embodiment of regulating the second current of the internal LDO regulator 110 will be described.

In an embodiment, the internal LDO regulator 110 may generate an on/off control signal CS based on a change amount of the supply voltage SV and may provide the on/off control signal CS to the first through nth header switches 121_1 through 121_n. In an embodiment, the on/off control signal CS may have a number of bits corresponding to a number of the first through nth header switches 121_1 through 121_n. For example, when the number of the first through nth header switches 121_1 through 121_n is 1024, the on/off control signal CS may include 10 bits. A value of the on/off control signal CS may indicate the number of header switches that are turned on or off from among the first through nth header switches 121_1 through 121_n.

In an embodiment, the internal LDO regulator 110 may generate the on/off control signal CS for changing a power-on/off state of at least one of the first through nth header switches 121_1 through 121_n when an amount of a change in the supply voltage SV is out of a second threshold range. In the specification, the expression "within the range" may mean that, when the range is defined by a starting point and an end point, a value is greater than the starting point and less than the end point, and the expression "out of the range" may mean that the value is equal to or less than the starting point or equal to or greater than the end point. For example, the internal LDO regulator 110 may control the number of header switches that are in a power-on state from among the first through nth header switches 121_1 through 121_n to increase when the supply voltage SV is reduced by a degree that is beyond the second threshold range. Also, the internal LDO regulator 110 may control the number of header switches that are in a power-on state from among the first through nth header switches 121_1 through 121_n to decrease when the supply voltage SV is increased by a degree that is beyond the second threshold range. In the specification, current flowing through one header switch may be referred to as unit current, and the second current may be regulated by the unit current through on/off control of one header switch.

In an embodiment, the internal LDO regulator 110 may adaptively operate according to a state of at least one of the header switch circuit 121 and the logic circuit 122.

The internal LDO regulator 110 may adjust a frequency of controlling on/off states of the first through nth header switches 121_1 through 121_n in response to a rapid change or a large change in load current of the logic circuit 122. In detail, the internal LDO regulator 110 may adjust a frequency to increase when load current of the logic circuit 122 rapidly increases and the supply voltage SV is less than a reference voltage. That is, the internal LDO regulator 110 may provide the on/off control signal CS whose value changes more frequently than before to the header switch circuit 121, which will be described below in detail.

In an embodiment, each of the first through nth header switches 121_1 through 121_n may be implemented as a digital power transistor. In the specification, the digital power transistor may be referred to as a digital transistor. The first through nth header switches 121_1 through 121_n may be fully turned on, and in this case, a magnitude of unit current may increase as a difference between an input voltage and an output voltage of the header switch increases. The internal LDO regulator 110 may adjust a number of header switches whose power-on/off states are changed by one on/off control operation, based on a difference between an input voltage and an output voltage of at least one of the first through nth header switches 121_1 through 121_n by considering states that affect the magnitude of the unit current of the first through nth header switches 121_1 through 121_n, which will be described below in detail.

In an embodiment, a sum of the first current of the internal LDO regulator 110 and the second current of the header switch circuit 121 may track (or follow) load current of the logic circuit 122. For example, the first current of the internal LDO regulator 110 may be regulated within the first threshold range, and the second current of the header switch circuit 121 may be regulated stepwise.

In an embodiment, the header switch circuit 121 may further include a plurality of header switches (not shown) that are collectively turned on/off by power gating control for the core 120. The plurality of header switches (not shown) may receive a control signal (not shown) from a power management unit (PMU) included in the system-on-chip 100.

In an embodiment, the first through nth header switches 121_1 through 121_n may be uniformly distributed in a region where the core 120 is located. This is to effectively stabilize the supply voltage SV by regulating the second current of the header switch circuit 121, which will be described below in detail.

The internal LDO regulator 110 according to an embodiment of the inventive concept may regulate the first current generated in the internal LDO regulator 110 to be limited within the first threshold range, for stabilization of the supply voltage SV, and regulate the second current of the header switch circuit 121 by controlling on/off states of the first through nth header switches 121_1 through 121_n included in the core 120. Accordingly, The internal LDO regulator 110 according to an embodiment of the inventive concept may reduce power consumption and improve the unit cost and design area of the internal LDO regulator 110.

Also, the internal LDO regulator 110 according to an embodiment of the inventive concept may more effectively stabilize the supply voltage SV by adaptively operating according to a state of at least one of the header switch circuit 121 and the logic circuit 122.

Figure 2B:
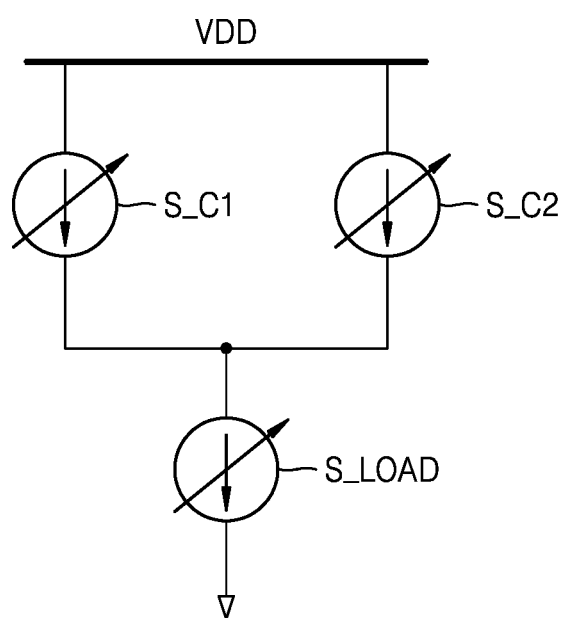
FIG. 2B is a diagram for describing a relationship between a first current source, a second current source, and a load current source.

FIG. 2A is a flowchart illustrating an operating method of an internal LDO regulator included in a system-on-chip, according to an embodiment of the inventive concept. FIG. 2B is a diagram for describing a relationship between a first current source S_C1, a second current source S_C2, and a load current source S_LOAD. To provide better understanding of the inventive concept, FIG. 2A will be described with reference to FIG. 1.

Referring to FIG. 2A, in operation S100, the internal LDO regulator 110 may detect a change in the supply voltage SV.

In operation S110, the internal LDO regulator 110 may regulate first current by using a first loop in response to the change in the supply voltage SV. In the specification, the first loop may be a loop formed only in the internal LDO regulator 110 and may refer to a loop for regulating the first current output through the output node N_OUT. In operation S120, the internal LDO regulator 110 may monitor whether the first current is within a threshold range. When it is 'NO' in operation S120, in operation S130, the internal LDO regulator 110 may regulate second current by using a second loop. In the specification, the second loop may be a loop formed in the internal LDO regulator 110 and the header switch circuit 121 and may refer to a loop for regulating the second current output through the header switch circuit 121. When the first current is out of the threshold range, the internal LDO regulator 110 may control the first current to fall within the threshold range by regulating the second current.

In an embodiment, the internal LDO regulator 110 may regulate the first current by using the first loop in response to a fine change (e.g., relatively small change) in the supply voltage SV, and may additionally regulate the second current by using the second loop in response to a coarse change (e.g., relatively large change) in the supply voltage SV.

Referring further to FIG. 2B, the system-on-chip 100 may include the first current source S_C1, the second current source S_C2, and the load current source S_LOAD. The first current source S_C1 may correspond to the internal LDO regulator 110, the second current source S_C2 may correspond to the header switch circuit 121, and the load current source S_LOAD may correspond to the load circuit 122.

In an embodiment, the first current source S_C1 and the second current source S_C2 may be connected in parallel. The first current source S_C1 may output the first current that is regulated within the threshold range, and the second current source S_C2 may regulate the second current stepwise when the first current is out of the threshold range. For example, the second current source S_C2 may adjust one-time regulation amount of the second current (adjust an amount of the second current in one-time regulation), or may adjust a frequency of regulating the second current.

In an embodiment, a sum of the first current of the first current source S_C1 and the second current of the second current source S_C2 may track the load current of the load current source S_LOAD.

Figure 3A:
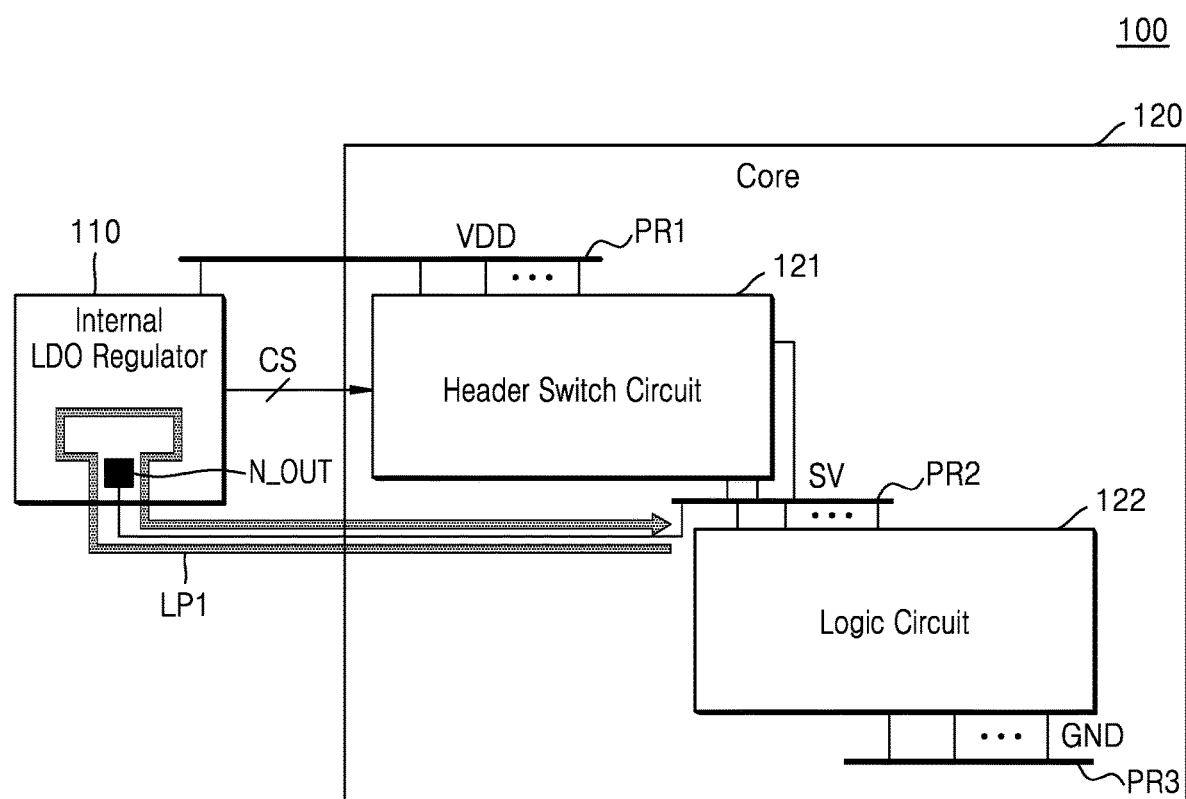
FIGS. 3A and 3B are block diagrams illustrating a system-on-chip for regulating current by using a first loop or a second loop, according to an embodiment of the inventive concept.
Figure 3B:
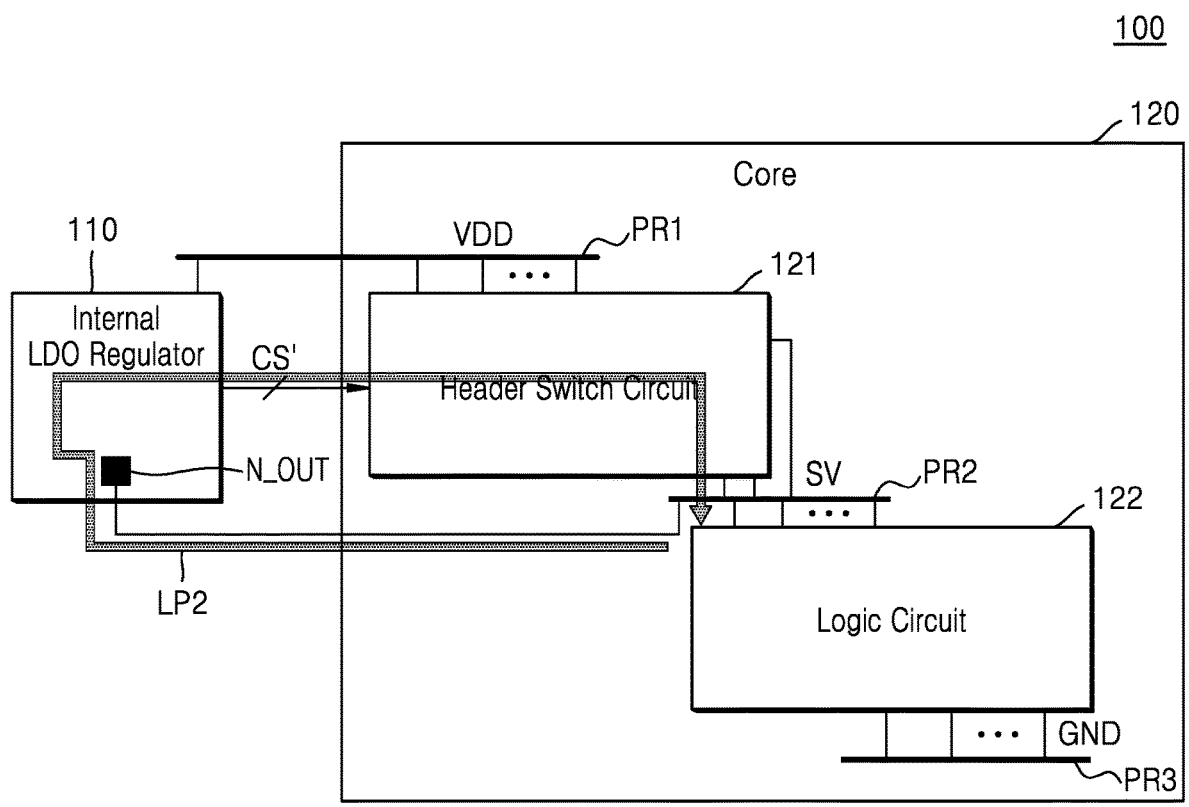

FIGS. 3A and 3B are block diagrams illustrating a system-on-chip for regulating current by using a first loop LP1 or a second loop LP2, according to an embodiment of the inventive concept.

Referring to FIG. 3A, the system-on-chip 100 may include the internal LDO regulator 110 and the core 120. The core 120 may include the header switch circuit 121 and the logic circuit 122.

In an embodiment, the internal LDO regulator 110 may regulate first current within a threshold range by using the first loop LP1 in response to a change in the supply voltage SV. The first loop LP1 may include a path between the second power rail PR2 and the output node N_OUT and an internal path of the internal LDO regulator 110. The internal LDO regulator 110 may provide the on/off control signal CS having the same value as that of a previous on/off control signal CS to the header switch circuit 121. The header switch circuit 121 may output second current having the same magnitude as that of previous second current to the second power rail PR2 based on the on/off control signal CS.

Referring further to FIG. 3B, the internal LDO regulator 110 may regulate the second current by using the second loop LP2 when the first current according to the change in the supply voltage SV is out of the threshold range. The second loop LP2 may include a path between the second power rail PR2 and the output node N_OUT, and a path between the internal LDO regulator 110 and the header switch circuit 121. The internal LDO regulator 110 may provide an on/off control signal CS' having a value different from that of a previous on/off control signal CS' to the header switch circuit 121. The header switch circuit 121 may output the second current having a magnitude different from that of previous second current to the second power rail PR2 based on the on/off control signal CS'. The internal LDO regulator 110 may regulate the first current outside the threshold range to fall within the threshold range in response to the regulated second current.

Figure 4:
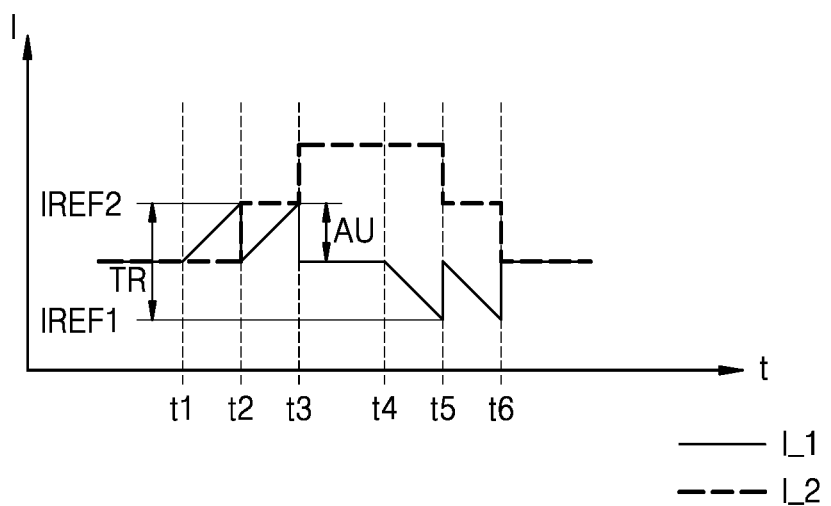
FIG. 4 is a graph for describing an operating method of an internal LDO regulator, according to an embodiment of the inventive concept.

FIG. 4 is a graph for describing an operating method of an internal LDO regulator, according to an embodiment of the inventive concept. In FIG. 4, first current I_1 and second current I_2 regulated by the internal LDO regulator according to a change in load current are illustrated. A threshold range TR may be defined as a range between first reference current IREF1 and second reference current IREF2.

Referring to FIG. 4, the internal LDO regulator may regulate the first current I_1 to increase when the load current increases between a first time t1 and a second time t2. At the second time t2, the first current I_1 may become out of the threshold range TR (or may be not within the threshold range TR), and in response thereto, the internal LDO regulator may regulate the second current I_2. The internal LDO regulator may regulate the second current I_2 stepwise. For example, the internal LDO regulator may regulate the second current I_2 in a certain regulated magnitude unit AU. In some embodiments, the regulated magnitude unit AU may vary according to a state of the header switch circuit 121 (see FIG. 1). Also, the internal LDO regulator may regulate the second current I_2 at a certain frequency. In some embodiments, the frequency may vary according to a supply voltage. The internal LDO regulator may regulate the first current I_1 to fall within the threshold range TR in response to the second current I_2 that is regulated at the second time t2.

The internal LDO regulator may regulate the first current I_1 to increase when the load current increases between the second time t2 and a third time t3. At the third time t3, the first current I_1 may become out of the threshold range TR, and in response thereto, the internal LDO regulator may regulate the second current I_2 to further increase by the regulated magnitude unit AU. The internal LDO regulator may regulate the first current I_1 to fall within the threshold range TR in response to the second current I_2 that is regulated at the third time t3.

The internal LDO regulator may regulate the first current I_1 to decrease when the load current decreases between a fourth time t4 and a fifth time t5. At the fifth time t5, the first current I_1 may become out of the threshold range TR, and in response thereto, the internal LDO regulator may regulate the second current I_2 to decrease by the regulated magnitude unit AU. The internal LDO regulator may regulate the first current I_1 to fall within the threshold range TR in response to the second current I_2 that is regulated at the fifth time t5.

The internal LDO regulator may regulate the first current I_1 to decrease when the load current decreases between the fifth time t5 and a sixth time t6. At the sixth time t6, the first current I_1 may become out of the threshold range TR, and in response thereto, the internal LDO regulator may regulate the second current I_2 to further decrease by the regulated magnitude unit AU. The internal LDO regulator may regulate the first current I_1 to fall within the threshold range TR in response to the second current I_2 that is regulated at the sixth time t6.

As shown in FIG. 4, the internal LDO regulator may regulate the first current I_1 within the threshold range TR in response to a change in the load current, and may regulate the second current I_2 based on a certain regulated magnitude unit AU and a certain frequency such that the first current I_1 is within the threshold range TR. A sum of the regulated first and second currents I_1 and I_2 may track the load current.

Figure 5:
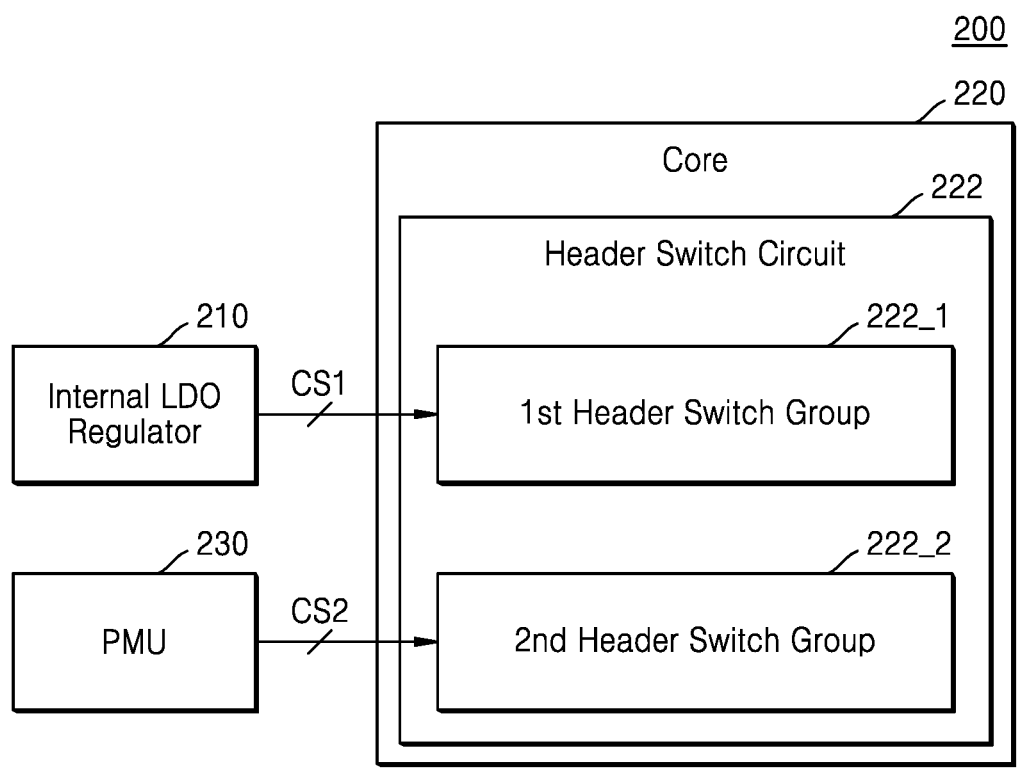
FIG. 5 is a block diagram illustrating a system-on-chip, according to an embodiment of the inventive concept.

FIG. 5 is a block diagram illustrating a system-on-chip 200, according to an embodiment of the inventive concept.

Referring to FIG. 5, the system-on-chip 200 may include an internal LDO regulator 210, a core 220, and a power management unit (PMU) 230. The core 220 may include a header switch circuit 222.

In an embodiment, the header switch circuit 222 may include a first header switch group 222_1 and a second header switch group 222_2. Header switches included in the first header switch group 222_1 may correspond to the first through nth header switches 121_1 through 121_n in FIG. 1. As described above, the header switches included in the first header switch group 222_1 may be controlled to be turned on/off based on a first on/off control signal CS1 from the internal LDO regulator 210. In the specification, the header switches included in the first header switch group 222_1 may be referred to as first header switches. Second current output from the first header switch group 222_1 may be regulated based on the first on/off control signal CS1.

Header switches included in the second header switch group 222_2 may be controlled to be turned on/off based on a second on/off control signal CS2 from the PMU 230. In the specification, the header switches included in the second header switch group 222_2 may be referred to as second header switches. The PMU 230 may generate the second on/off control signal CS2 for power gating control. The power gating control may correspond to a method of controlling a power-on/off state (or an active/idle state) of the core 220. For example, the PMU 230 may provide the second on/off control signal CS2 for collectively turning on the header switches included in the second header switch group 222_2 to control the power-on state of the core 220. The PMU 230 may provide the second on/off control signal CS2 for collectively turning off the header switches included in the second header switch group 222_2 to control the power-off state of the core 220.

In an embodiment, the header switches included in the first header switch group 222_1 may be turned off when the core 220 is in the power-off state, and control for the header switches included in the first header switch group 222_1 according to an embodiment of the inventive concept may be performed when the core 220 is in the power-on state.

Figure 6A:
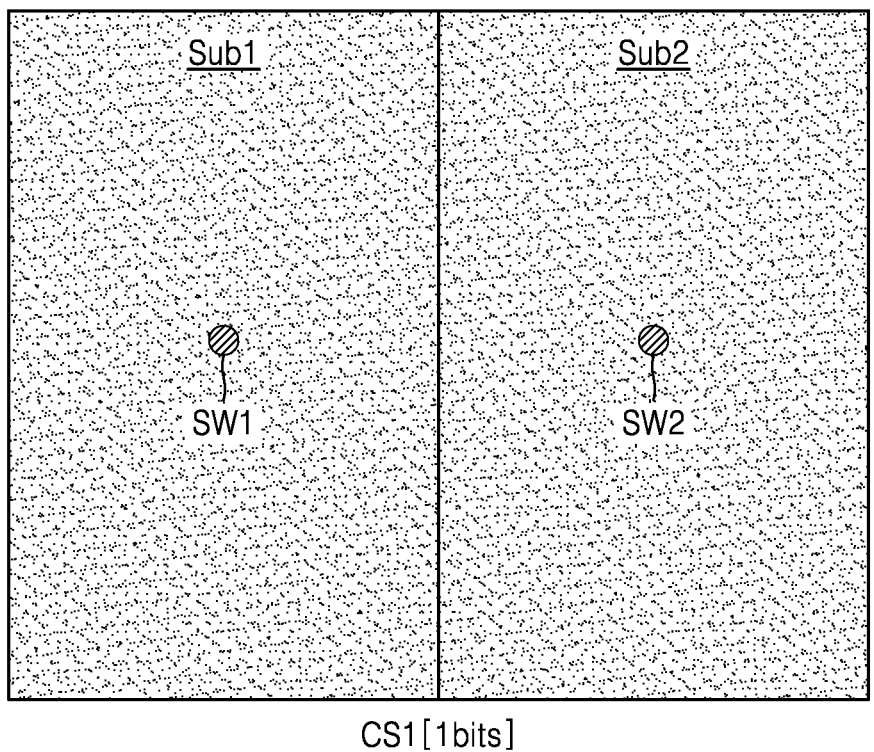
Figure 6B:
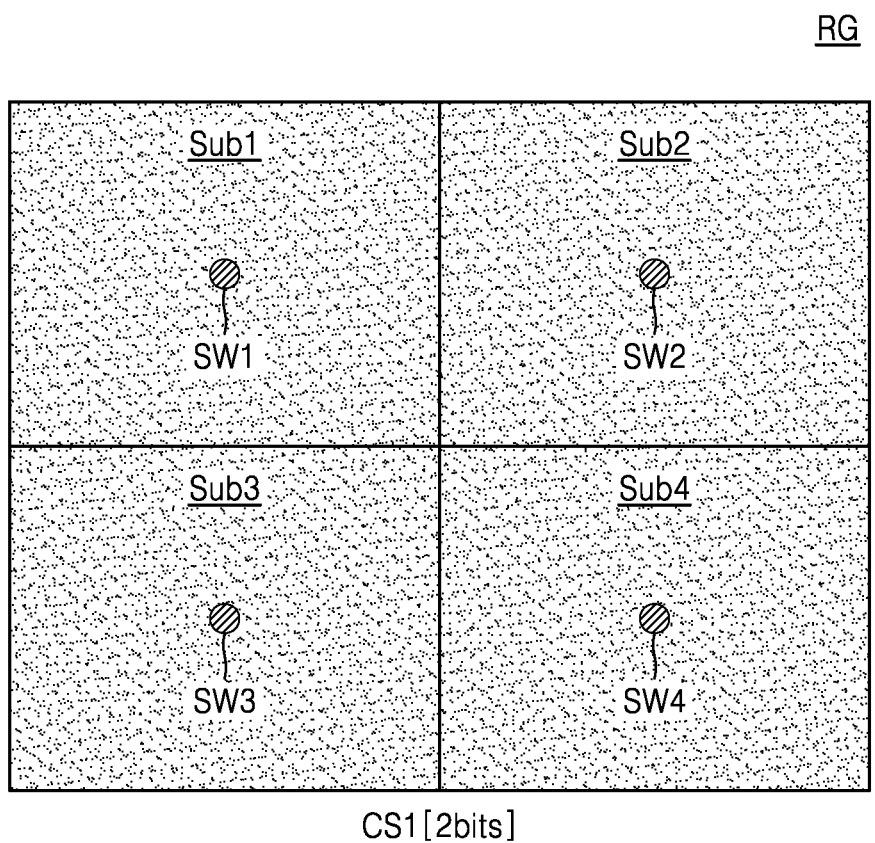

FIGS. 6A, 6B, and 6C are views for describing a distribution of header switches included in the first header switch group 222_1.

Referring to FIG. 6A, the first on/off control signal CS1 includes one bit, and the first header switch group 222_1 may include two header switches SW1 and SW2. A region RG where a core is located may include first and second sub-regions Sub1 and Sub2, and the two header switches SW1 and SW2 may be uniformly distributed in the first and second sub-regions Sub1 and Sub2, respectively.

Referring to FIG. 6B, the first on/off control signal CS1 includes two bits, the first header switch group 222_1 may include four header switches SW1 through SW4. The region RG where the core is located may include first through fourth sub-regions Sub1 through Sub4, and the four header switches SW1 through SW4 may be uniformly distributed in the first through fourth sub-regions Sub1 through Sub4, respectively.

Referring to FIG. 6C, when the first on/off control signal CS1 includes four bits, the first header switch group 222_1 may include 16 header switches SW1 through SW16. The region RG where the core is located may include first through $16^{th}$ sub-regions Sub1 through Sub16, and the 16 header switches SW1 through SW16 may be uniformly distributed in the first through $16^{th}$ sub-regions Sub1 through Sub16, respectively.

Because header switches are uniformly distributed in the region RG as in FIGS. 6A through 6C, a difference in time taken for the first on/off control signal CS1 to reach each of the header switches may be minimized.

An arrangement of header switches illustrated in FIGS. 6A through 6C is merely an example, and the inventive concept is not limited thereto, and a various number of header switches may be uniformly distributed in a region where a core is located. In some embodiments, header switches may be concentrated in at least one sub-region of a region where a core is located.

Figure 7A:
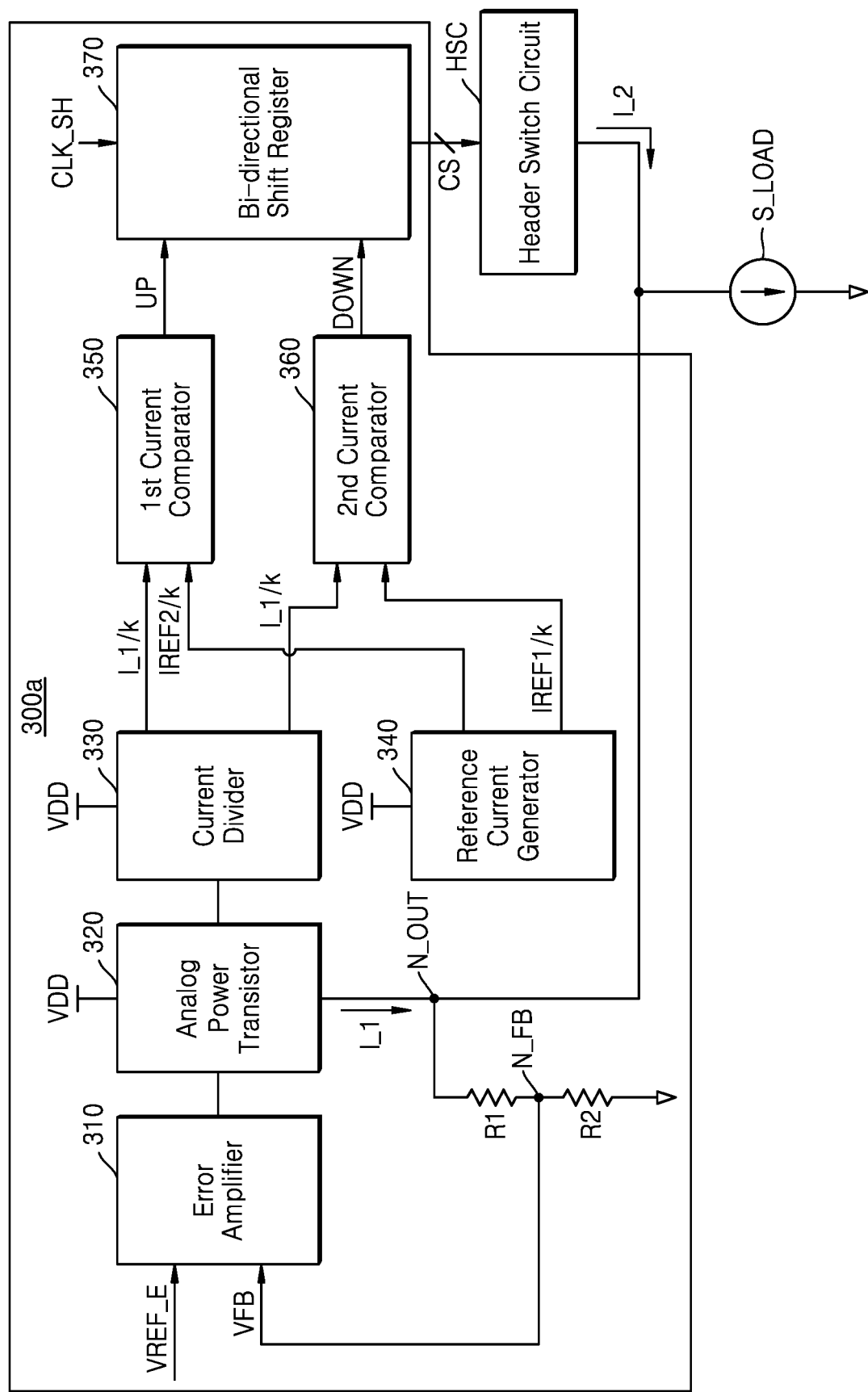
FIG. 7A is a block diagram illustrating an internal LDO regulator, according to an embodiment of the inventive concept.
Figure 7B:
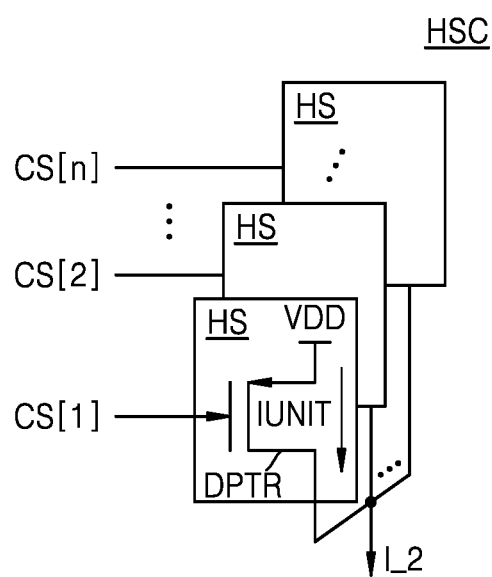
FIG. 7B is a diagram illustrating a header switch circuit of FIG. 7A.

FIG. 7A is a block diagram illustrating an internal LDO regulator 300a, according to an embodiment of the inventive concept. FIG. 7B is a diagram illustrating a header switch circuit HSC of FIG. 7A.

Referring to FIG. 7A, the internal LDO regulator 300a may include a first resistor R1, a second resistor R2, an error amplifier 310, an analog power transistor 320, a current divider 330, a reference current generator 340, a first current comparator 350, a second current comparator 360, and a bidirectional shift register 370. In the specification, the analog power transistor 320 may be referred to as an analog transistor.

The internal LDO regulator 300a may detect a supply voltage applied to the load current source S_LOAD through the output node N_OUT. The detected supply voltage may be divided in a resistance value ratio between the first and second resistors R1 and R2 at a feedback node N_FB and may be applied as a feedback voltage VFB to the error amplifier 310. The error amplifier 310 may receive an error reference voltage VREF_E and the feedback voltage VFB, may compare the error reference voltage VFEF_E with the feedback voltage VFB, and may provide a comparison result signal to the analog power transistor 320. The analog power transistor 320 may generate first current I_1 from the power supply voltage VDD based on the comparison result signal and may output the first current I_1 to the load current source S_LOAD through the output node N_OUT. The current divider 330 may copy the first current I_1 by using the first power supply voltage VDD, may divide the copied first current I_1 into k currents (k is an integer equal to or greater than 2), and may provide divided first current I_1/k to the first and second current comparators 350 and 360. The reference current generator 340 may generate divided first reference current IREF1/k and divided second reference current IREF2/k by using the power supply voltage VDD and may respectively provide the divided first reference current IREF1/k and the divided second reference current IREF2/k to the first and second current comparators 350 and 360. For example, the reference current generator 340 may generate the divided first reference current IREF1/k by dividing the first reference current IREF of FIG. 4 by k, and may generate the divided second reference current IREF2/k by dividing the second reference current IREF2 of FIG. 4 by k. An embodiment of dividing the first and second reference currents IREF21 and IREF2 and the first current I_1 by k is for reducing power consumption, but the inventive concept is not limited thereto, and operations according to embodiments of the inventive concept may be performed by using the first and second reference currents IREF1 and IREF2 and the first current I_1 which are not divided. In an embodiment, the reference current generator 340 may further include a switch (not shown) copied from at least one of first header switches to generate reference current in which characteristics of the first header switches included in the header switch circuit HSC are reflected.

The first current comparator 350 may compare the divided first current I_1/k with the divided second reference current IREF2/k and may generate an up signal UP based on a comparison result. For example, the first current comparator 350 may generate the up signal UP having a value of '1' when the divided first current I_1/k is greater than the divided second reference current IREF2/k, and may generate the up signal UP having a value of '0' when the divided first current I_1/k is equal to or less than the second reference current IREF2/k.

The second current comparator 360 may compare the divided first current I_1/k with the divided first reference current IREF1/k, and may generate a down signal DOWN based on a comparison result. For example, the second current comparator 360 may generate the down signal DOWN having a value of '1' when the divided first current I_1/k is less than the divided first reference current IREF1/k, and may generate the down signal DOWN having a value of '0' when the divided first current I_1/k is equal to or greater than the divided first reference current IREF1/k. Hereinafter, a signal having a value of '1' is defined as an activated signal, and a signal having a value of '0' is defined as a deactivated signal.

In an embodiment, the bidirectional shift register 370 may output the on/off control signal CS based on the up signal UP and the down signal DOWN in synchronization with a clock signal CLK_SH. The bidirectional shift register 370 may include a plurality of storage areas in which bit values indicating on-numbers of first header switches (or numbers of turn-on first header switches) of the first header switch circuit HSC are sequentially stored. The bidirectional shift register 370 may output the on/off control signal CS having a bit value stored in a storage area of a position shifted from a current position in response to an activated signal from among the up signal UP and the down signal DOWN. In detail, the bidirectional shift register 370 may output the on/off control signal CS having a bit value stored in a storage area of a position shifted in a first direction from a current position in response to the activated up signal UP. The bidirectional shift register 370 may output the on/off control signal CS having a bit value stored in a storage area of a position shifted in a second direction from a current position in response to the activated down signal DOWN. The first header switches included in the header switch circuit HSC may be turned on or off based on the on/off control signal CS to regulate the second current I_2.

Referring further to FIG. 7B, the header switch circuit HSC may include a plurality of first header switches HS. The on/off control signal CS may include n control signals CS[1] through CS[n]. The first header switches HS may be controlled to be turned on/off based on the respective control signals CS [1] through CS [n]. Each of the first header switches HS (or a digital power transistor DPTR that is a switch copied from the first header switch) may generate unit current IUNIT from the power supply voltage VDD in a power-on state. For example, when r first header switches HS (r is an integer equal to or greater than 1) are turned on by the on/off control signal CS, the second current I_2 may be regulated to increase by r times the unit current IUNIT. Also, when r first header switches HS are turned off by the on/off control signal CS, the second current I_2 may be regulated to decrease by r times the unit current IUNIT. In this case, a regulated magnitude unit of the second current I_2 may be r times the unit current IUNIT.

In an embodiment, a difference between the first reference current REF1 and the second reference current REF2 may be set to be greater than the unit current IUNIT.

Figure 8:
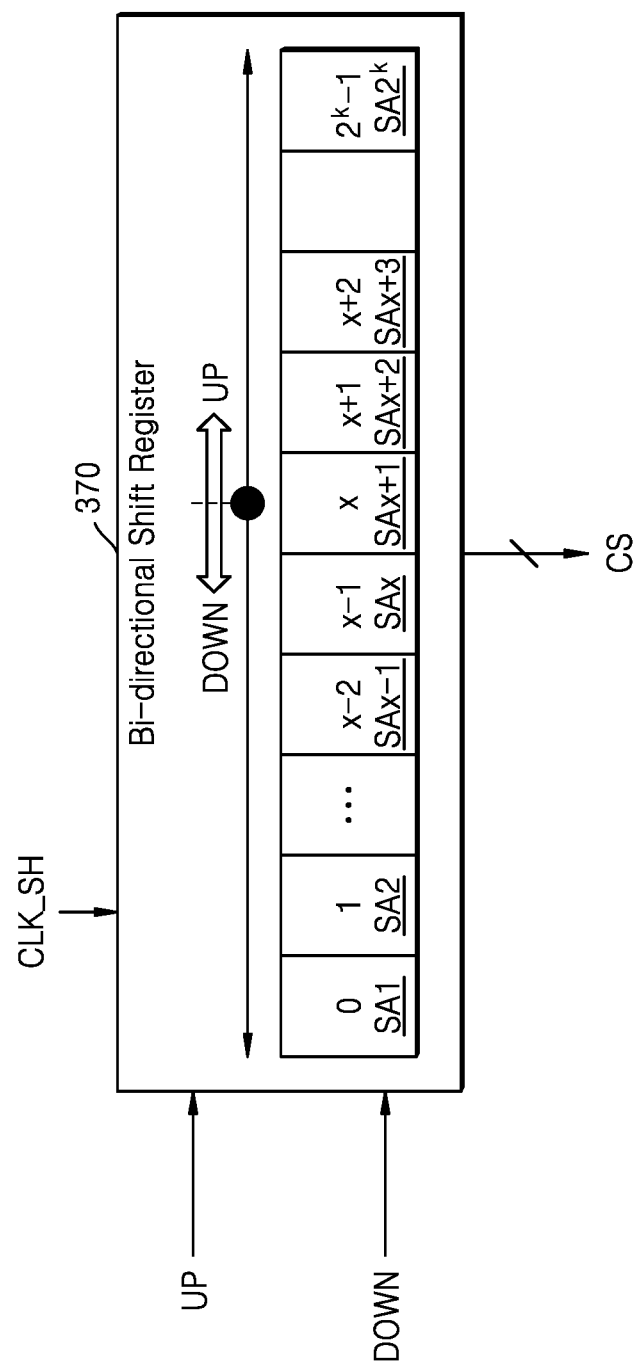
FIG. 8 is a block diagram illustrating a bidirectional shift register of FIG. 7A.

FIG. 8 is a block diagram illustrating the bidirectional shift register 370 of FIG. 7A.

Referring to FIG. 8, the bidirectional shift register 370 may include a plurality of storage areas SA1 through SA$2^k$, and bit values indicating on-numbers 0 through $2^k-1$ of first header switches may be respectively stored in the storage areas SA1 through SA$2^k$. For example, the bidirectional shift register 370 may output the on/off control signals CS having bit values of storage areas shifted based on the up signal UP and the down signal DOWN from an x+$1^{th}$ storage area SAx+1 that is a current position.

In an embodiment, the bidirectional shift register 370 may perform a shift operation on the storage areas SA1 through SA$2^k$ in synchronization with the clock signal CLK_SH. For example, the bidirectional shift register 370 may perform a shift operation on the storage areas SA1 through SA$2^k$ based on the up signal UP and the down signal DOWN at a rising edge (or a falling edge) of the clock signal CLK_SH. As a result, a bit value of the on/off control signal CS may be changed in synchronization with the clock signal CLK_SH. In some embodiments, the bidirectional shift register 370 may perform a shift operation on the storage areas SA1 through SA$2^k$ based on the up signal UP and the down signal DOWN at duel edges (including a rising edge and a falling edge) of the clock signal CLK_SH.

In an embodiment, a shift degree in one shift operation of the bidirectional shift register 370 may be variable. For example, in the bidirectional shift register 370, at a rising edge of the clock signal CLK_SH, shift may be made by 1, and then may be adjusted to be made by 2 at the rising edge of the clock signal CLK_SH. According to such a shift degree adjustment method, the on/off control signal CS may change on/off of one first header switch when the shift degree is one, and then may change on/off of two second header switches when the shift degree is two.

Also, in an embodiment, a frequency of the clock signal CLK_SH synchronized with the bidirectional shift register 370 may be variable. For example, the bidirectional shift register 370 may be synchronized with the clock signal CLK_SH having a first frequency, and then may be adjusted to be synchronized with the clock signal CLK_SH having a second frequency, which will be described later in detail.

Figure 9:
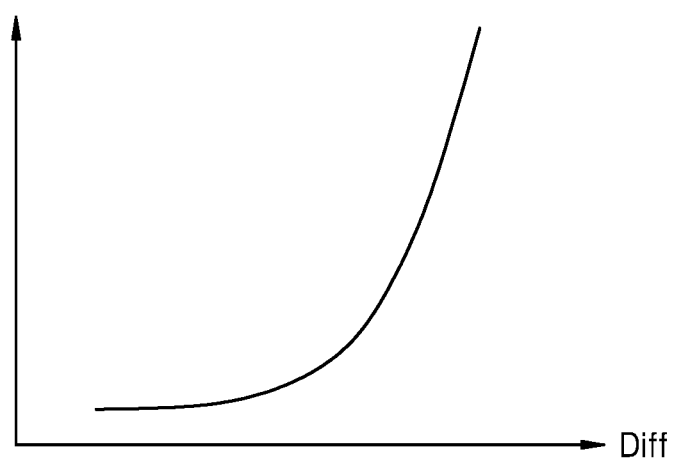
FIG. 9 is a graph showing characteristics of a header switch according to an embodiment of the inventive concept.

FIG. 9 is a graph showing characteristics of a header switch according to an embodiment of the inventive concept.

Referring to FIG. 9, because a header switch is fully turned on, a magnitude of unit current output from the header switch may rapidly increase as a difference Diff between an input voltage and an output voltage increases. In an embodiment, the header switch may include a p-channel digital power transistor, the input voltage may be a source voltage of the digital power transistor, and the output voltage may be a drain voltage of the digital power transistor. In some embodiments, the header switch may include an n-channel digital power transistor, the input voltage may be a drain voltage of the digital power transistor, and the output voltage may be a source voltage of the digital power transistor. The input voltage may correspond to a power supply voltage, and the output voltage may correspond to a supply voltage of a load circuit. In an actual embodiment, because a fluctuation range in a magnitude of unit current of the header switch may increase due to a fluctuation in the input voltage and a fluctuation in the output voltage of the header switch, an operation considering these characteristics is required.

Figure 10:
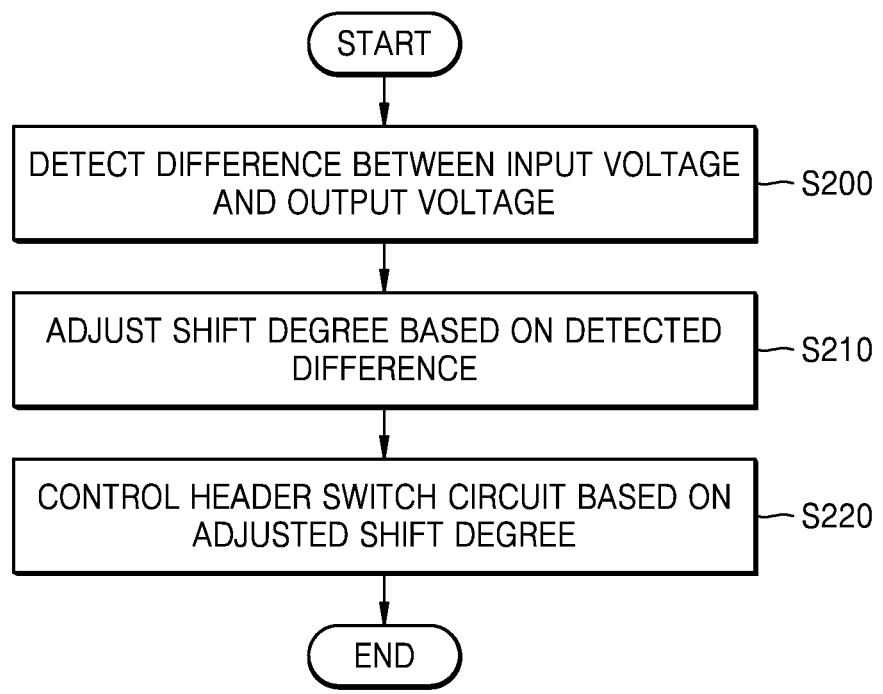
FIG. 10 is a flowchart for describing an operating method of an internal LDO regulator considering characteristics of a first header switch of FIG. 9, according to an embodiment of the inventive concept.

FIG. 10 is a flowchart for describing an operating method of an internal LDO regulator considering characteristics of a first header switch of FIG. 9, according to an embodiment of the inventive concept.

Referring to FIG. 10, in operation S200, an internal LDO regulator may detect a difference between an input voltage and an output voltage of a least one of first header switches of a header switch circuit. In operation S210, the LDO regulator may adjust a shift degree for a bidirectional shift register based on the detected difference. For example, when a magnitude of unit current of the first header switch increases as the difference between the input voltage and the output voltage increases, the internal LDO regulator may adjust the shift degree for the bidirectional shift register to decrease in order to reduce the number of first header switches whose on/off is changed by an on/off control signal. In another example, when the magnitude of the unit current of the first header switch decreases as the difference between the input voltage and the output voltage decreases, the internal LDO regulator may adjust the shift degree for the bidirectional shift register to increase in order to increase the number of first header switches whose on/off is changed by an on/off control signal. In operation S220, the internal LDO regulator may control the header switch circuit based on the adjusted shift degree.

Figure 11:
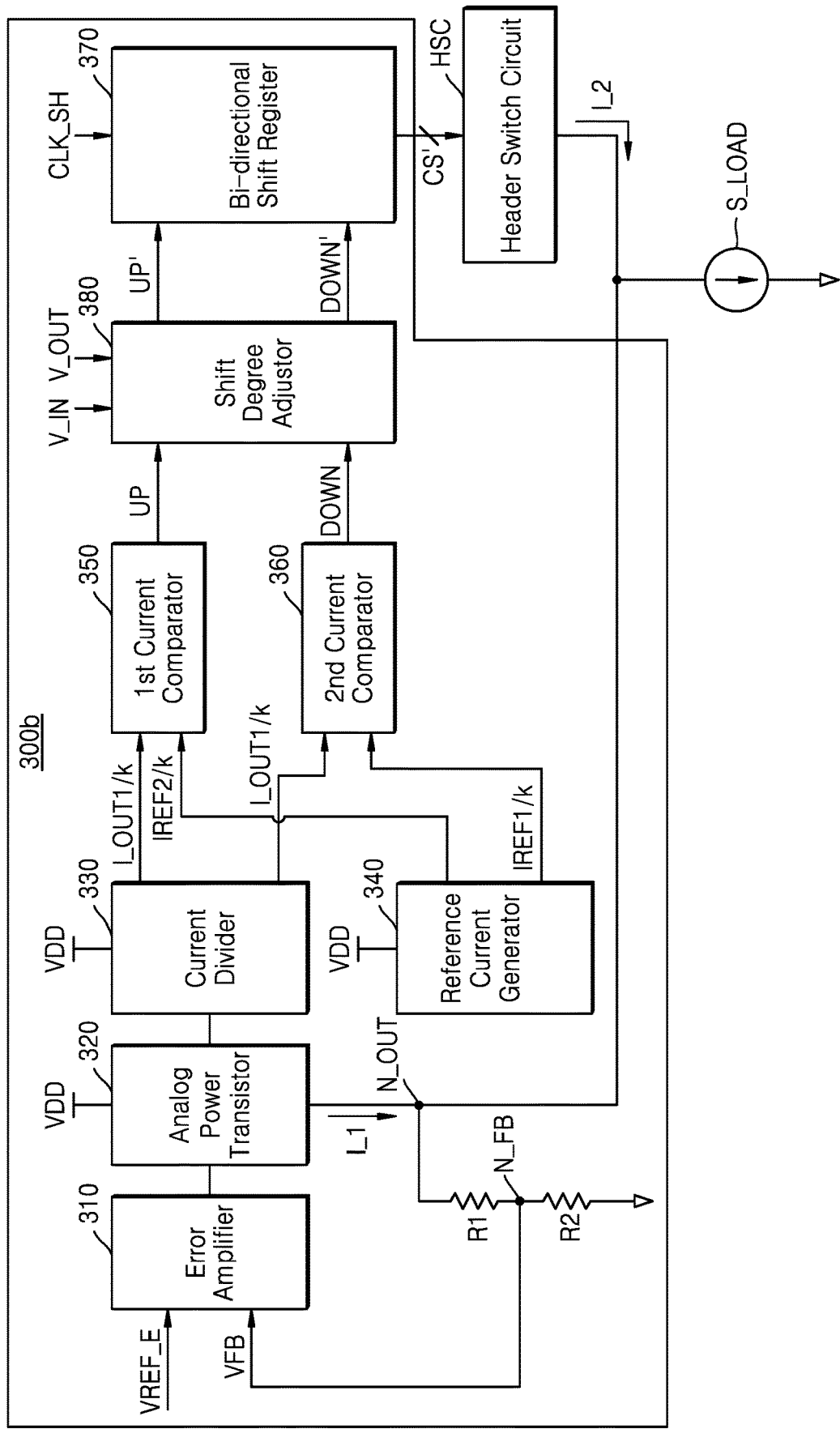
FIG. 11 is a block diagram illustrating an internal LDO regulator that performs an operation of FIG. 10.

FIG. 11 is a block diagram illustrating an internal LDO regulator 300b that performs an operation of FIG. 10. Hereinafter, a difference from the internal LDO regulator 300a of FIG. 7A will be mainly described.

Referring to FIG. 11, the internal LDO regulator 300b may further include a shift degree adjustor 380, when compared to FIG. 7A.

In an embodiment, the shift degree adjustor 380 may detect an input voltage V_IN and an output voltage V_OUT of at least one first header switch of the header switch circuit HSC, and may adjust a shift degree for the bidirectional shift register 370 based on a difference between the input voltage V_IN and the output voltage V_OUT. In some embodiments, the internal LDO regulator 300b may further include a switch copied from at least one first header switch of the header switch HSC, and may detect the input voltage V_IN and the output voltage V_OUT of the switch.

In an embodiment, the shift degree adjustor 380 may receive a first up signal UP and a first down signal DOWN from the first and second current comparators 350 and 360, and may generate a second up signal UP' and a second down signal DOWN' corresponding to the adjusted shift degree. The bidirectional shift register 370 may perform a shift operation corresponding to the adjusted shift degree based on the second up signal UP' and the second down signal DOWN', and then may output an on/off control signal CS'. That is, the number of transistors whose on/off is changed by the on/off control signal CS' may vary according to adjustment of the shift degree for the bidirectional shift register 370.

For example, the shift degree adjustor 380 may generate the second up signal UP' and the second down signal DOWN' for adjusting the shift degree to decrease when the difference between the input voltage V_IN and the output voltage V_OUT increases. Alternatively, the shift degree adjustor 380 may generate the second up signal UP' and the second down signal DOWN' for adjusting the shift degree to increase when the difference between the input voltage V_IN and the output voltage V_OUT decreases.

Figure 12A:
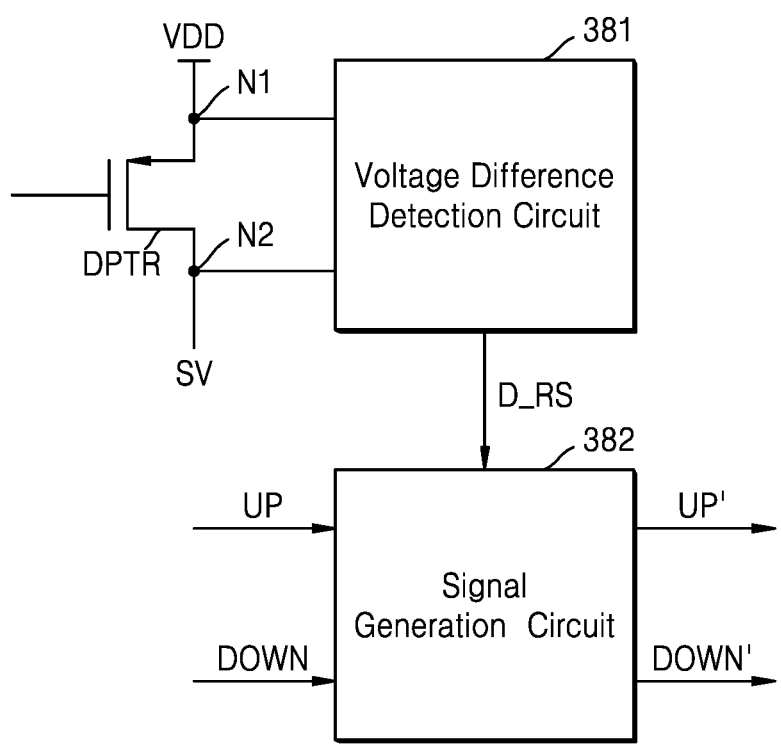
FIG. 12A is a block diagram illustrating a shift degree adjustor of FIG. 11.
Figure 12B:
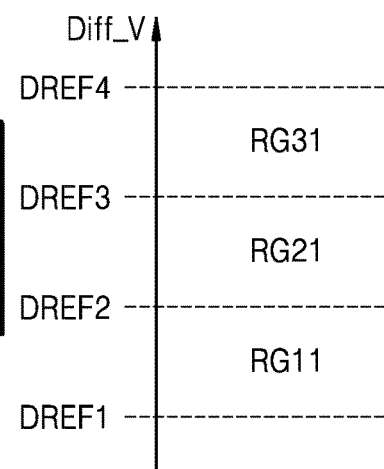
FIG. 12B is a diagram for describing an operation of a shift degree adjustor of FIG. 12A.

FIG. 12A is a block diagram illustrating the shift degree adjustor 380 of FIG. 11. FIG. 12B is a diagram for describing an operation of the shift degree adjustor 380 of FIG. 12A.

Referring to FIG. 12A, the shift degree adjustor 380 may include a voltage difference detection circuit 381 and a signal generation circuit 382. The voltage difference detection circuit 381 may receive an input voltage from a first node N1 of a first header switch or a digital power transistor DPTR that is a switch copied from the first header switch, and may receive an output voltage from a second node N2. For example, the first node N1 may be connected to a source terminal of the digital power transistor DPTR, and the second node N2 may be connected to a drain terminal of the digital power transistor DPTR. The input voltage may correspond to the power supply voltage VDD, and the output voltage may correspond to the supply voltage SV.

In an embodiment, the voltage difference detection circuit 381 may detect a difference between the input voltage and the output voltage, may generate a detection result signal D_RS, and may provide the detection result signal D_RS to the signal generation circuit 382. The signal generation circuit 382 may generate the second up signal UP' and the second down signal DOWN' from the first up signal UP and the first down signal DOWN based on the detection result signal D_RS.

In an embodiment, the signal generation circuit 382 may adjust a shift degree for a bidirectional shift register according to a range within which the difference between the input voltage and the output voltage falls.

Referring to FIG. 12B, the signal generation circuit 382 may generate the second up signal UP' and the second down signal DOWN' so that the number of first header switches that are turned on by an on/off control signal is 'A1' or the number of first header switches that are turned off is 'A2', when a difference Diff_V (hereinafter, referred to as a voltage difference) between the input voltage and the output voltage falls within a first range RG11. The first range RG11 may be defined as a range between a first reference difference DREF1 and a second reference difference DREF2. For example, 'A1' and 'A2' may be the same, or may be different from each other.

The signal generation circuit 382 may generate the second up signal UP' and the second down signal DOWN' so that the number of first header switches that are turned on by the on/off control signal is 'B1' or the number of first header switches that are turned off is 'B2', when the voltage difference Diff_V falls within a second range RG21. The second range RG21 may be defined as a range between the second reference difference DREF2 and a third reference difference DREF3. For example, 'B1' and 'B2' may be the same, or may be different from each other.

The signal generation circuit 382 may generate the second up signal UP' and the second down signal DOWN' so that the number of first header switches that are turned on by the on/off control signal is 'C1' or the number of first header switches that are turned off is 'C2', when the voltage difference Diff_V falls within a third range RG31. The third range RG31 may be defined as a range between the third reference difference DREF3 and a fourth reference difference DREF4. For example, 'C1' and 'C2' may be the same, or may be different from each other.

In an embodiment, when arranged according to magnitudes, there may be a relationship of 'A1>B1>C1', and 'A2>B2>C2'.

However, an embodiment illustrated in FIG. 12B is merely an example, and the inventive concept is not limited thereto, and the number (or a shift degree) of first header switches whose on/off is changed by an on/off control signal may be adjusted according to more or less ranges of the voltage differences between the input voltage and the output voltage.

Figure 13:
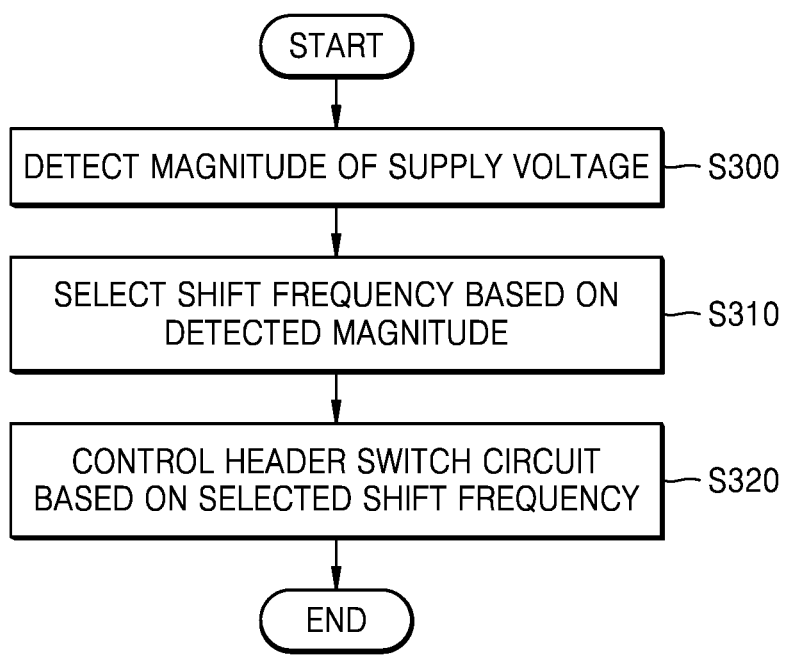
FIG. 13 is a flowchart for describing an operating method of an internal LDO regulator, according to an embodiment of the inventive concept.

FIG. 13 is a flowchart for describing an operating method of an internal LDO regulator, according to an embodiment of the inventive concept.

Referring to FIG. 13, in operation S300, an internal LDO regulator may detect a magnitude of a supply voltage for a load circuit. When the supply voltage greatly changes, an operation of the internal LDO regulator for rapidly stabilizing the supply voltage may be required. In operation S310, the internal LDO regulator may adjust a shift frequency based on the detected magnitude of the supply voltage. In detail, when the supply voltage rapidly changes, the internal LDO regulator may rapidly change a bit value of an on/off control signal by increasing a shift frequency of a bidirectional shift register, and thus second current may be rapidly regulated to correspond to the rapidly changing supply voltage. In some embodiments, the internal LDO regulator may select any one of a plurality of clock signals having different frequencies based on the detected magnitude of the supply voltage. In operation S320, the internal LDO regulator may control a header switch circuit based on the adjusted shift frequency. In detail, the internal LDO regulator may provide a clock signal having the adjusted shift frequency to the bidirectional shift register, and may control the header switch circuit by using the on/off control signal output from the bidirectional shift register synchronized with the clock signal. In the specification, the shift frequency may be referred to as an operating frequency of the bidirectional shift register.

Figure 14:
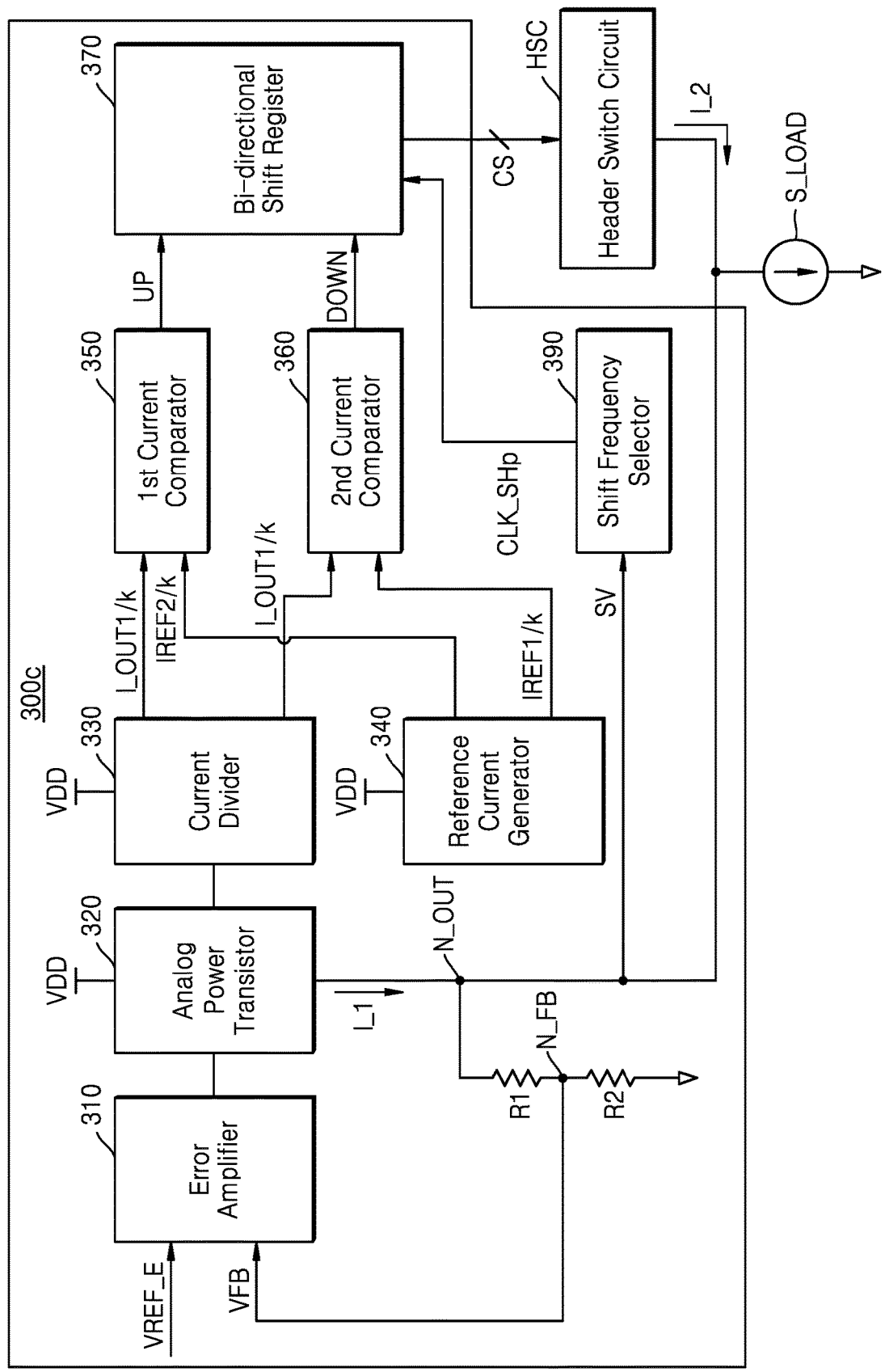
FIG. 14 is a block diagram illustrating an internal LDO regulator that performs an operation of FIG. 13.

FIG. 14 is a block diagram illustrating an internal LDO regulator 300c that performs an operation of FIG. 13. Hereinafter, a difference from the internal LDO regulator 300a of FIG. 7A will be mainly described.

Referring to FIG. 14, the internal LDO regulator 300c may further include a shift frequency selector 390 when compared to FIG. 7A.

In an embodiment, the shift frequency selector 390 may receive the supply voltage SV from the output node N_OUT, and may detect a change in the supply voltage SV. The shift frequency selector 390 may detect a magnitude of the supply voltage SV by using at least one reference voltage. The shift frequency selector 390 may select a shift frequency for the bidirectional shift register 370 based on the detected magnitude of the supply voltage SV. The shift frequency selector 390 may provide a clock signal CLK_SHp having the selected shift frequency to the bidirectional shift register 370. For example, when it is detected that the magnitude of the supply voltage SV is lower than that of the reference voltage, the shift frequency selector 390 may select a clock signal having a shift frequency higher than a previous one and may provide the clock signal to the bidirectional shift register 370.

In an embodiment, the bidirectional shift register 370 may receive the clock signal CLK_SHp having a shift frequency varying according to the magnitude of the supply voltage SV, and may output the on/off control signal CS in synchronization with the clock signal CLK_SHp. For example, when the clock signal CLK_SHp having a shift frequency higher than a previous one is received, the bidirectional shift register 370 may output the on/off control signal CS having a bit value that changes more frequently than before. As a result, an on/off control frequency for first header switches of the header switch circuit HSC may increase.

Figure 15A:
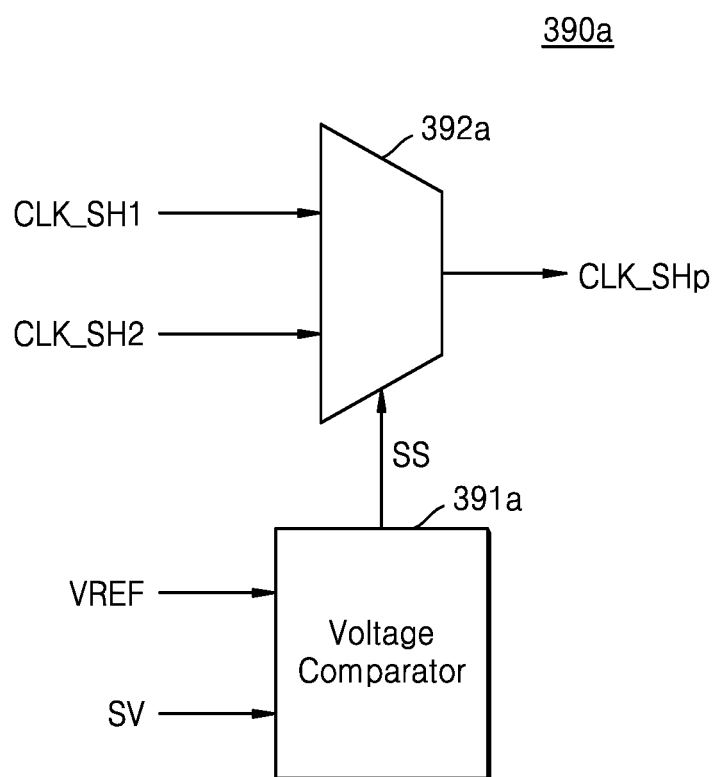
FIG. 15A is a block diagram illustrating an example of a shift frequency selector of FIG. 14.
Figure 15B:
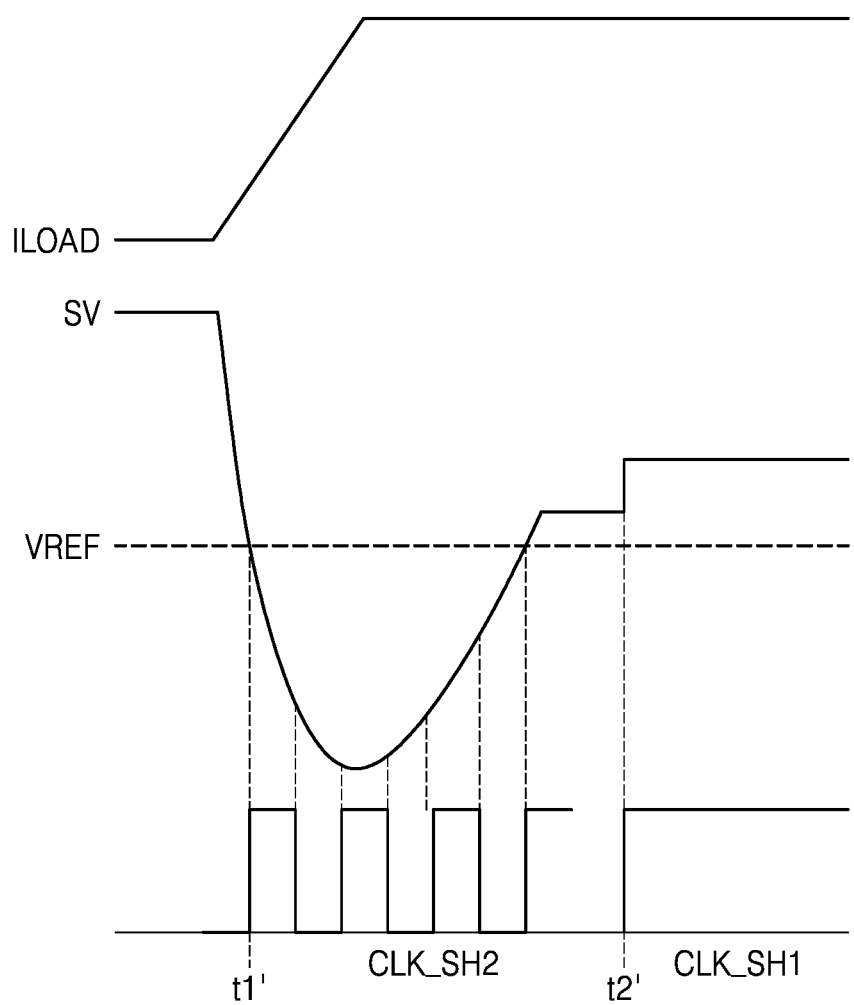
FIG. 15B is a diagram for describing an operation of a shift frequency selector of FIG. 15A.

FIG. 15A is a block diagram illustrating an example of the shift frequency selector 390 of FIG. 14. FIG. 15B is a diagram for describing an operation of a shift frequency selector 390a of FIG. 15A.

Referring to FIG. 15A, the shift frequency selector 390a may include a voltage comparator 391a and a multiplexer 392a. The voltage comparator 391a may receive a reference voltage VREF and the supply voltage SV, may compare the reference voltage VREF with the supply voltage SV, and may generate a selection signal SS based on a comparison result.

The multiplexer 392a may receive a first clock signal CLK_SH1 having a first shift frequency, and a second clock signal CLK_SH2 having a second shift frequency. For example, the second shift frequency may be higher than the first shift frequency. In an embodiment, the first and second clock signals CLK_SH1 and CLK_SH2 may be generated in the internal LDO regulator or may be generated by processing (e.g., frequency dividing) an external reference clock signal. The multiplexer 392a may select any one of the first and second clock signals CLK_SH1 and CLK_SH2 in response to the selection signal SS and may provide the selected clock signal CLK_SHp to a bidirectional shift register.

Referring further to FIG. 15B, in an illustrative example, as load current ILOAD rapidly increases, the supply voltage SV may rapidly decrease. The voltage comparator 391a may generate the selection signal SS for selecting the second clock signal CLK_SH2 when the supply voltage SV is lower than the reference voltage VREF at a first time t1', and may provide the selection signal SS to the multiplexer 392a. The multiplexer 392a may provide the second clock signal CLK_SH2 to the bidirectional shift register during the first time t1' to a second time t2'. For example, the bidirectional shift register may perform a shift operation based on the up signal UP and the down signal DOWN at every rising edge or falling edge of the second clock signal CLK_SH2. Next, the voltage comparator 391a may generate the selection signal SS for selecting the first clock signal CLK_SH1 when the supply voltage SV is higher than the reference voltage VREF at the second time t2', and may provide the selection signal SS to the multiplexer 392a. The multiplexer 392a may provide the first clock signal CLK_SH1 to the bidirectional shift register beginning from the second time t2'.

Figure 16A:
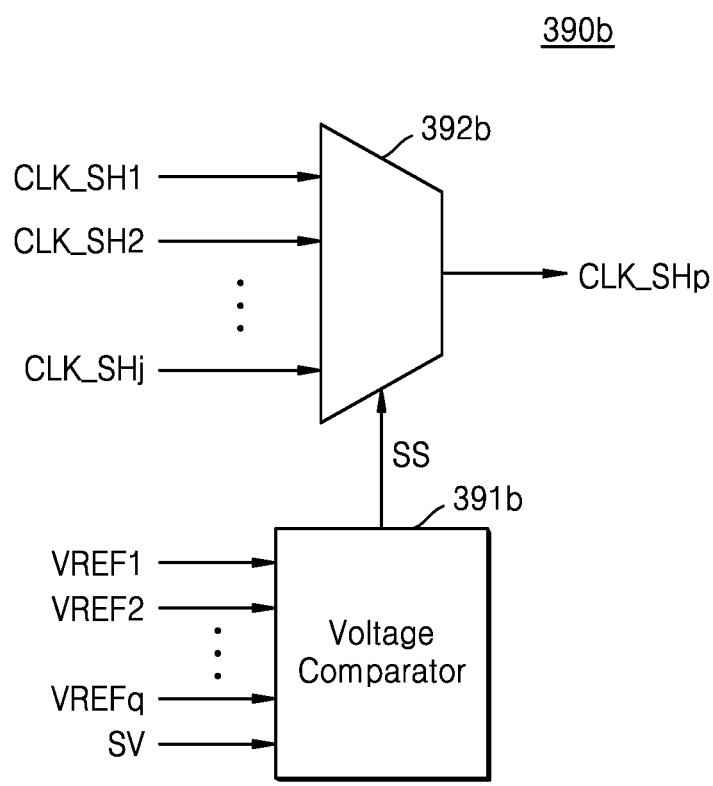
FIG. 16A is a block diagram illustrating another example of the shift frequency selector of FIG. 14.
Figure 16B:
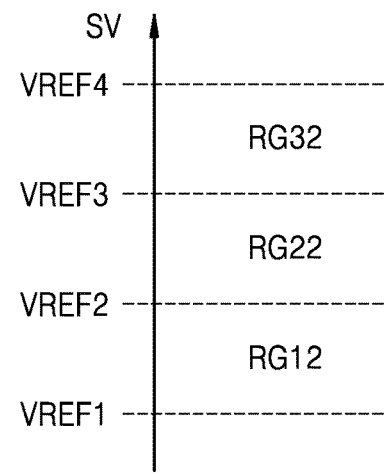
FIG. 16B is a diagram for describing an operation of a shift frequency selector of FIG. 16A.

FIG. 16A is a block diagram illustrating another example of the shift frequency selector 390 of FIG. 14. FIG. 16B is a diagram for describing an operation of a shift frequency selector 390b of FIG. 16A.

Referring to FIG. 16A, the shift frequency selector 390b may include a voltage comparator 391b and a multiplexer 392b. The voltage comparator 391b may receive first through $q^{th}$ reference voltages VREF1 through VREFq (q is an integer equal to or greater than 3) and the supply voltage SV, may compare the supply voltage SV with each of the first through $q^{th}$ reference voltages VREF1 through VREFq, and may identify a range within which a magnitude of the supply voltage SV falls. The voltage comparator 391b may generate the selection signal SS based on the identified range, and may provide the selection signal SS to the multiplexer 392b.

The multiplexer 392b may receive first through $j^{th}$ clock signals CLK_SH1 through CLK_SHj (j is an integer equal to or greater than 3) having different shift frequencies. In an embodiment, the first through $j^{th}$ clock signals CLK_SH1 through CLK_SHj may be generated in the internal LDO regulator, or may be generated by processing (e.g., frequency dividing) an external reference clock signal. The multiplexer 392b may select any one of the first through $j^{th}$ clock signals CLK_SH1 through CLK_SHj in response to the selection signal SS, and may provide the selected clock signal CLK_SHp to a bidirectional shift register.

Referring further to FIG. 16B, the multiplexer 392b may select and output the first clock signal CLK_SH1 having a first shift frequency based on the selection signal, when the supply voltage falls within a first range RG12. The first range RG12 may be defined as a range between the first reference voltage VREF1 and the second reference voltage VREF2.

The multiplexer 392b may select and output the second clock signal CLK_SH2 having a second shift frequency based on the selection signal SS, when the supply voltage falls within a second range RG22. The second range RG22 may be defined as a range between the second reference voltage VREF2 and the third reference voltage VREF3.

The multiplexer 392b may select and output the third clock signal CLK_SH3 having a third shift frequency based on the selection signal SS, when the supply voltage falls within a third range RG32. The third range RG32 may be defined as a range between the third reference voltage VREF3 and the fourth reference voltage VREF4.

In an embodiment, when arranged according to frequencies, the first clock signal CLK_SH1, the second clock signal CLK_SH2, and the third clock signal CLK_SH3 may be arranged (that is, CLK_SH1>CLK_SH2>CLK_SH3).

However, an embodiment of FIG. 16B is merely an example, and the inventive concept is not limited thereto, and the multiplexer 392b may select any one of a plurality of clock signals according to more or less ranges of the supply voltage and may output the clock signal to the bidirectional shift register.

Figure 17:
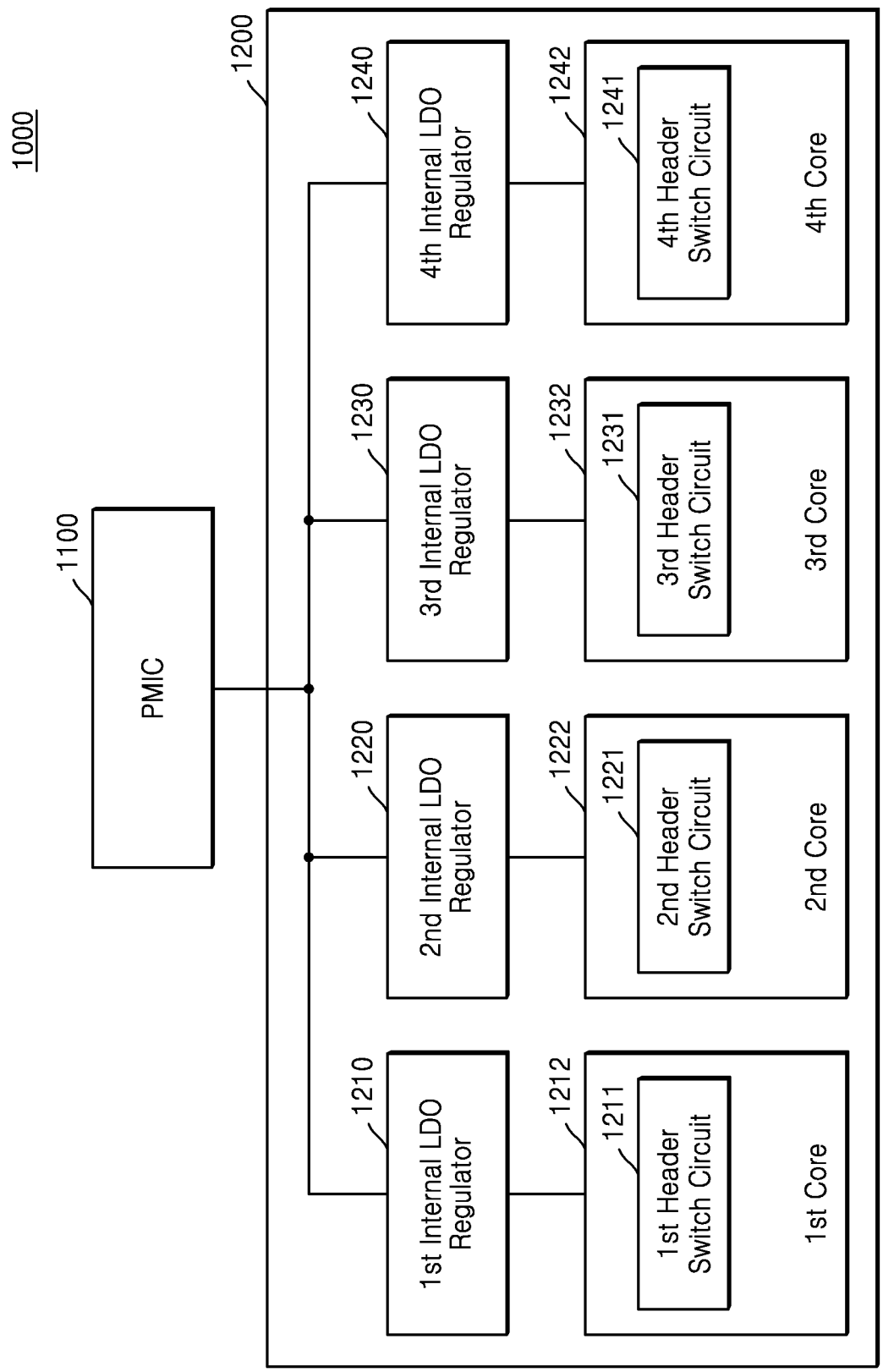
FIG. 17 is a block diagram illustrating a computing system, according to an embodiment of the inventive concept.

FIG. 17 is a block diagram illustrating a computing system 1000, according to an embodiment of the inventive concept.

Referring to FIG. 17, the computing system 1000 may include a PMIC 1100 and a system-on-chip 1200. The system-on-chip 1200 may include first through fourth internal LDO regulators 1210 through 1240, and first through fourth cores 1212 through 1242. The first through fourth cores 1212 through 1242 may respectively include first through fourth header switches 1211 through 1241. The first through fourth internal LDO regulators 1210 through 1240 may receive a power supply voltage from the PMIC 1100.

The embodiments of the inventive concept of FIGS. 1 through 16B may be applied to the first through fourth internal LDO regulators 1210 through 1240 and the first through fourth header switch circuits 1211 through 1241. In an embodiment, the numbers of first header switches included in the first through fourth header switch circuits 1211 through 1241 may be the same or different. Also, distributions of the first header switches included in the first through fourth header switch circuits 1211 through 1241 may be the same or different.

In an embodiment, the first through fourth internal LDO regulators 1210 through 1240 may differently operate by considering fluctuation trends of supply voltages of the first through fourth cores 1212 through 1242. In some embodiments, the first through fourth internal LDO regulators 1210 through 1240 may determine parameter values (e.g., shift degrees or shift frequencies for a bidirectional shift register) suitable for the cores 1212 through 1242 respectively connected to the first through fourth internal LDO regulators 1210 through 1240 through a certain training or the like, and may perform an operation according to the inventive concept.

In some embodiments, the system-on-chip 1200 may further include a fifth core (not shown), and the inventive concept may not be applied to the fifth core (not shown). That is, the inventive concept may be selectively applied to a core having an unstable supply voltage according to characteristics such as a design from among a plurality of cores.

Figure 18:
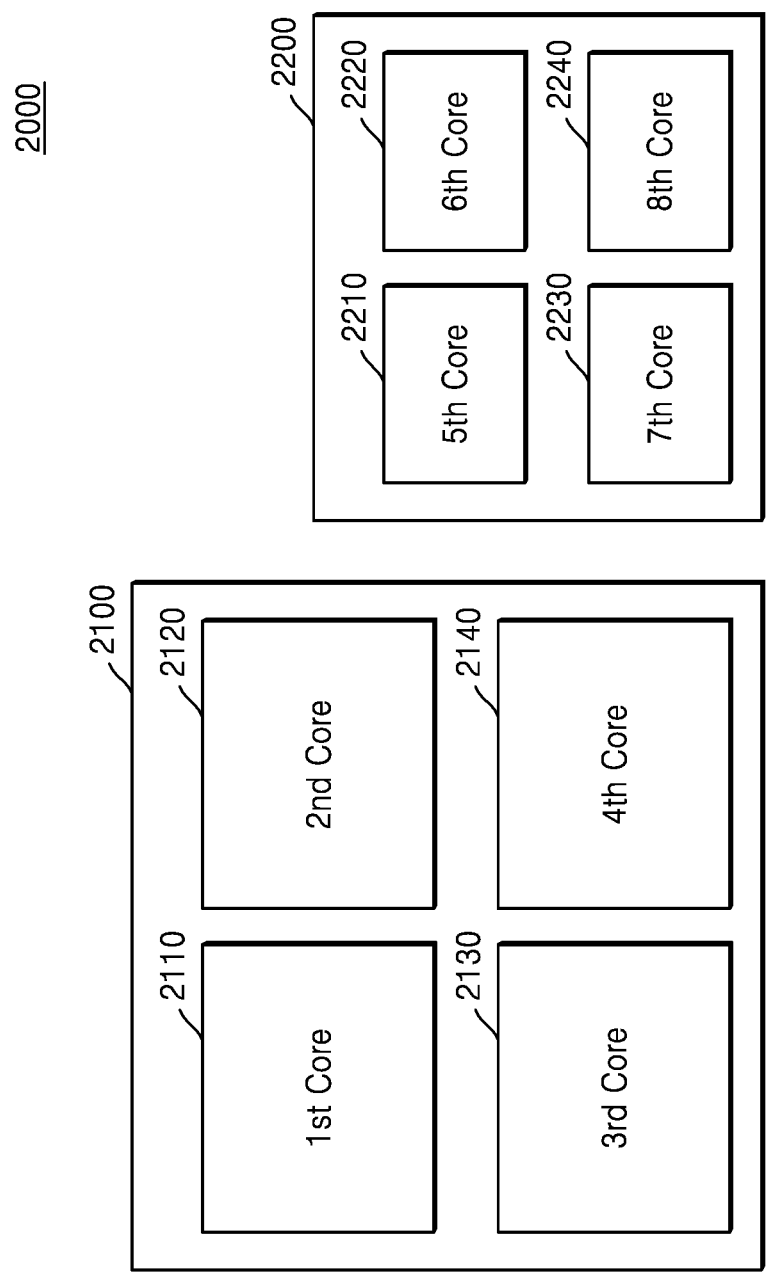
FIG. 18 is a block diagram illustrating a computing system, according to an embodiment of the inventive concept.

FIG. 18 is a block diagram illustrating a computing system 2000, according to an embodiment of the inventive concept.

Referring to FIG. 18, the computing system 2000 may include a first cluster 2100 and a second cluster 2200. The first cluster 2100 may be referred to as a big cluster, and the second cluster 2200 may be referred to as a little cluster. The first cluster 2100 may include first through fourth cores 2110 through 2140, and the second cluster 2200 may include fifth through eighth cores 2210 through 2240. The first cluster 2100 may operate at a higher frequency based on higher performance than that of the second cluster 2200.

In an embodiment, the number of first header switches included in each of the first through fourth cores 2110 through 2140 of the first cluster 2100 may be greater than the number of first header switches included in each of the fifth through eighth cores 2210 through 2240 of the second cluster 2200. Also, in an embodiment, values of operation-related parameters for stabilizing supply voltages of the first through fourth cores 2110 through 2140 of the first cluster 2100 (e.g., shift degrees and/or shift frequencies for a bidirectional shift register) may be different from values of operation-related parameters for stabilizing supply voltages of the fifth through eighth cores 2210 through 2240 of the second cluster 2200.

While the inventive concept has been particularly shown and described with reference to example embodiments thereof, it will be understood that various changes in form and details may be made therein without departing from the spirit and scope of the following claims.

What is claimed is:

1. A system-on-chip comprising:
   a core comprising:
     a header switch circuit including a plurality of header switches configured to transmit a power supply voltage, applied to a first power rail, as a supply voltage to a second power rail; and
     a logic circuit configured to operate based on the supply voltage received from the second power rail;
   a low-dropout (LDO) regulator configured to control on/off states of first header switches among the plurality of header switches based on a power state of the core and the supply voltage; and
   a power management unit (PMU) configured to control power gating of the core, by collectively turning on or turning off on/off second header switches among the plurality of header switches to control a power-on state or a power-off state of the core.

2. The system-on-chip of claim 1, wherein the first header switches are distributed in equal numbers in each of sub-regions where the core is located.

3. The system-on-chip of claim 1, wherein a number of the first header switches is different from a number of the second header switches.

4. The system-on-chip of claim 1, wherein the first header switches are individually controlled to be on/off by the LDO regulator and the second header switches are controlled to be on by the PMU, when the core is in the power-on state.

5. The system-on-chip of claim 1, wherein the first header switches are controlled to be off by the LDO regulator and the second header switches are controlled to be off by the PMU, when the core is in the power-off state.

6. The system-on-chip of claim 1, wherein the LDO regulator is further configured to adjust first current output to the second power rail based on the supply voltage.

7. The system-on-chip of claim 1, wherein the LDO regulator is connected to the first power rail and configured to operate based on the power supply voltage.

8. The system-on-chip of claim 1, wherein the LDO regulator includes a bidirectional shift register including storage areas storing bit values indicating a number of switches to be controlled to be turned on among the first header switches, is further configured to control on/off states of the first header switches using the bidirectional shift register.

9. The system-on-chip of claim 8, wherein the LDO regulator is further configured to adjust at least one of a shift frequency and a shift degree associated with the bidirectional shift register based on the supply voltage.

10. The system-on-chip of claim 1, wherein the first header switches and the second header switches include p-channel digital power transistors designed to be fully turned on.

11. The system-on-chip of claim 1, wherein the LDO regulator is further configured to adjust, based on a difference between an input voltage and an output voltage of at least one of first header switches, a number of first header switches whose on/off states are changed by one on/off control operation.

12. The system-on-chip of claim 11, wherein the input voltage corresponds to the power supply voltage, and wherein the output voltage corresponds to the supply voltage.

13. The system-on-chip of claim 1, wherein the LDO regulator is further configured to adjust a frequency of controlling on/off states of the first header switches.

14. The system-on-chip of claim 1, wherein the logic circuit comprises a plurality of logic blocks.

15. The system-on-chip of claim 1, wherein the LDO regulator is connected to a plurality of points of the second power rail through a plurality of lines, and is further configured to sense the supply voltage based on voltages of the plurality of points.

16. The system-on-chip of claim 1, wherein the LDO regulator is further configured to output control signals for controlling on/off states of the first header switches and a first current provided to the second power rail.

17. The system-on-chip of claim 1, wherein the first header switches are turned off when the core is in the power-off state by the power gating of the PMU, and the LDO regulator is configured to control the on/off states of first header switches based on the core being in the power-on state.

18. A system-on-chip comprising:
 a core comprising:
  a header switch circuit including a plurality of header switches configured to transmit a power supply voltage, applied to a first power rail, as a supply voltage to a second power rail; and
  a logic circuit configured to operate based on the supply voltage received from the second power rail; and
 a low-dropout (LDO) regulator configured to control on/off states of first header switches among the plurality of header switches based on a power state of the core and the supply voltage,
 wherein the LDO regulator includes a bidirectional shift register configured to generate on/off control signals for the first header switches, and
 wherein the system-on-chip further comprises a power management unit (PMU) configured to control power gating of the core, by collectively turning on or turning off second header switches among the plurality of header switches to control a power-on state or a power-off state of the core.

19. The system-on-chip of claim 18, wherein the LDO regulator is further configured to compare the supply voltage with a reference voltage, and select an operating frequency of the bidirectional shift register based on a comparison result.

20. The system-on-chip of claim 18, wherein the LDO regulator is further configured to adjust a shift degree of the bidirectional shift register based on a difference between an input voltage and an output voltage of at least one of the first header switches.

* * * * *